(12) United States Patent
Komura et al.

(10) Patent No.: US 8,654,617 B2
(45) Date of Patent: Feb. 18, 2014

(54) THERMALLY-ASSISTED MAGNETIC RECORDING HEAD WITH OPTICALLY ISOLATING WAVEGUIDE, HEAD GIMBAL ASSEMBLY, HEAD ARM ASSEMBLY, MAGNETIC DISK UNIT, AND LIGHT TRANSMISSION UNIT

(75) Inventors: Eiji Komura, Tokyo (JP); Tsutomu Chou, Tokyo (JP); Koji Shimazawa, Tokyo (JP); Shinji Hara, Tokyo (JP); Ryo Hosoi, Tokyo (JP); Nobuyuki Mori, Tokyo (JP); Yasutoshi Fujita, Hong Kong (CN); Hideki Tanzawa, Hong Kong (CN)

(73) Assignees: TDK Corporation, Tokyo (JP); Sae Magnetics (H.K.) Ltd., Hong Kong (CN)

( * ) Notice: Subject to any disclaimer, the term of this patent is extended or adjusted under 35 U.S.C. 154(b) by 0 days.

(21) Appl. No.: 13/426,142

(22) Filed: Mar. 21, 2012

(65) Prior Publication Data

US 2013/0250742 A1 Sep. 26, 2013

(51) Int. Cl.
*G11B 11/00* (2006.01)

(52) U.S. Cl.
USPC ..................... 369/13.33; 369/13.13

(58) Field of Classification Search
USPC .......... 369/13.33, 13.31, 13.32, 13.02, 13.17, 369/112.09, 112.14, 112.21, 112.27, 300; 360/59; 385/129, 31, 88–94; 29/603.07–603.27; 250/201.3, 201.5
See application file for complete search history.

(56) References Cited

U.S. PATENT DOCUMENTS

| | | | |
|---|---|---|---|
| 5,946,281 | A | 8/1999 | Ito et al. |
| 6,567,373 | B1 | 5/2003 | Kato et al. |
| 6,649,894 | B2 | 11/2003 | Matsumoto et al. |
| 6,768,556 | B1 | 7/2004 | Matsumoto et al. |
| 6,795,380 | B2 | 9/2004 | Akiyama et al. |
| 7,266,268 | B2 | 9/2007 | Challener et al. |
| 7,330,404 | B2 | 2/2008 | Peng et al. |
| 7,538,978 | B2 | 5/2009 | Sato et al. |
| 7,804,655 | B2 | 9/2010 | Shimazawa et al. |
| 7,864,635 | B2 | 1/2011 | Shimizu |
| 8,270,264 | B2 * | 9/2012 | Nakai ..................... 369/44.11 |
| 2002/0164106 | A1 * | 11/2002 | Mizuno ..................... 385/11 |

(Continued)

FOREIGN PATENT DOCUMENTS

| | | |
|---|---|---|
| JP | A-06-160930 | 6/1994 |
| JP | A-10-022565 | 1/1998 |

(Continued)

OTHER PUBLICATIONS

Rottmayer et al., "Heat-Assisted Magnetic Recording," *IEEE Transactions of Magnetics*, Oct. 2006, pp. 2417-2421, vol. 42, No. 10, IEEE.

*Primary Examiner* — Tan X Dinh
(74) *Attorney, Agent, or Firm* — Oliff PLC

(57) ABSTRACT

The thermally-assisted magnetic recording head includes: a laser light source having an emission surface, the emission surface allowing laser light to be emitted therefrom; a waveguide having a core and a cladding, the core allowing the laser light emitted from the laser light source to propagate therethrough, and the cladding surrounding the core; a magnetic pole; and a plasmon generator. Each of the core and the cladding has an end surface facing the emission surface, and the end surface of the cladding suppresses returning of the laser light to the laser light source.

14 Claims, 17 Drawing Sheets

(56) References Cited

U.S. PATENT DOCUMENTS

2005/0213436 A1    9/2005  Ono et al.
2008/0002298 A1    1/2008  Sluzewski
2011/0216635 A1*   9/2011  Matsumoto ............... 369/13.33

FOREIGN PATENT DOCUMENTS

| JP | A-2001-143316 | 5/2001 |
| JP | A-2001-255254 | 9/2001 |
| JP | B2-3231331 | 11/2001 |
| JP | A-2002-250842 | 9/2002 |
| JP | A-2002-298302 | 10/2002 |
| JP | A-2005-317178 | 11/2005 |
| JP | A-2006-185548 | 7/2006 |
| JP | A-2006-202461 | 8/2006 |
| JP | B2-4032689 | 1/2008 |
| JP | A-2008-47268 | 2/2008 |
| JP | A-2008-59645 | 3/2008 |
| JP | B2-4104584 | 6/2008 |

* cited by examiner

THERMALLY-ASSISTED MAGNETIC RECORDING HEAD WITH OPTICALLY ISOLATING WAVEGUIDE, HEAD GIMBAL ASSEMBLY, HEAD ARM ASSEMBLY, MAGNETIC DISK UNIT, AND LIGHT TRANSMISSION UNIT

BACKGROUND OF THE INVENTION

1. Field of the Invention

The present invention relates to a thermally-assisted magnetic recording head used in thermally-assisted magnetic recording in which near-field light is irradiated to a magnetic recording medium to lower a coercivity thereof so as to record information, and a head gimbal assembly, a head arm assembly, and a magnetic disk unit which are mounted with the thermally-assisted magnetic recording head, and a light source unit used therein.

2. Description of Related Art

A magnetic disk unit in the related art is used for writing and reading magnetic information (hereinafter, simply referred to as information). The magnetic disk unit is provided with, for example, in the housing thereof, a magnetic disk in which information is stored, and a magnetic read write head which records information into the magnetic disk and reproduces information stored in the magnetic disk. The magnetic disk is supported by a rotary shaft of a spindle motor, which is fixed to the housing, and rotates around the rotary shaft. On the other hand, the magnetic read write head is formed on a side surface of a magnetic head slider provided on one end of a suspension, and the magnetic read write head includes a magnetic write element and a magnetic read element which have an air bearing surface (ABS) facing the magnetic disk. In particular, as the magnetic read element, a magneto-resistive (MR) element exhibiting magneto-resistive effect is generally used. The other end of the suspension is attached to an end of an arm which is rotatably supported by a fixed shaft installed upright in the housing.

When the magnetic disk unit is not operated, namely, when the magnetic disk does not rotate, the magnetic read write head is not located over the magnetic disk and is pulled off to the position away from the magnetic disk (unload state). When the magnetic disk unit is driven and the magnetic disk starts to rotate, the magnetic read write head is changed to a state where the magnetic read write head is located at a predetermined position over the magnetic disk together with the suspension (load state). When the rotation number of the magnetic disk reaches a predetermined number, the magnetic head slider is stabilized in a state of slightly floating over the surface of the magnetic disk due to the balance of positive pressure and negative pressure. Thus, the information is accurately recorded and reproduced.

In recent years, with a progress in higher recording density (higher capacity) of the magnetic disk, an improvement in performance of the magnetic read write head and the magnetic disk has been demanded. The magnetic disk is a discontinuous medium including collected magnetic microparticles, and each magnetic microparticle has a single-domain structure. In the magnetic disk, one recording bit is configured by a plurality of magnetic microparticles. Since the asperity of a boundary between adjacent recording bits is necessary to be small in order to increase the recording density, the magnetic microparticles need to be made small. However, if the magnetic microparticles are small in size, thermal stability of the magnetization of the magnetic microparticles is lowered with decreasing the volume of the magnetic microparticles. To solve the issue, increasing magnetic anisotropy energy of the magnetic microparticle is effective. However, increasing the magnetic anisotropy energy of the magnetic microparticle leads to increase in the coercivity of the magnetic disk. As a result, difficulty occurs in the information recording using the existing magnetic head.

As a method to solve the above-described difficulty, so-called thermally-assisted magnetic recording has been proposed. In the method, a magnetic recording medium with large coercivity is used, and when information is written, heat is applied together with the magnetic field to a portion of the magnetic recording medium where the information is recorded to increase the temperature and to lower the coercivity, thereby recording the information. Hereinafter, the magnetic head used in the thermally-assisted magnetic recording is referred to as a thermally-assisted magnetic recording head.

In the thermally-assisted magnetic recording, near-field light is generally used for applying heat to a magnetic recording medium. For example, in Japanese Unexamined Patent Application Publication No. 2001-255254 and in Japanese Patent No. 4032689, disclosed is a technology of allowing frequency of light to coincide with a resonant frequency of plasmons which are generated in a metal, by directly applying light to a plasmon generator, in order to generate near-field light. In the method of directly applying light to a plasmon generator, however, the plasmon generator itself overheats and accordingly deforms, depending on usage environment or conditions. Therefore, practical realization of the method is difficult.

As a technology capable of avoiding such overheating, in Japanese Patent No. 4104584, a thermally-assisted magnetic recording head using surface plasmon polariton coupling is proposed. In this technology, without direct irradiation of light propagating through a waveguide (guided light) to a plasmon generator, the guided light is coupled to the plasmon generator through evanescent coupling, and surface plasmon polaritons generated on a surface of the plasmon generator are used.

In the thermally-assisted recording technology, although it is important to generate fine light spots, where and how to dispose a light source (laser light) is also highly important. For example, in Japanese Unexamined Patent Application Publication Nos. 2001-143316 and 2002-298302, a configuration which includes a combination of an optical fiber and a reflective mirror and guides light to a near-field generation element is disclosed. In addition, in Japanese Unexamined Patent Application Publication No. 2006-185548, a configuration in which a unit having a heat sink and a laser diode is mounted on a back surface of a slider, and a suspension is sandwiched between the slider and the unit is disclosed. Moreover, in Japanese Unexamined Patent Application Publication No. 2008-59645, a technology in which a laser diode chip including a monolithically-integrated reflective mirror is mounted on a back surface of a slider to guide light to the slider is disclosed. Furthermore, in Japanese Unexamined Patent Application Publication No. 2006-202461, a diffraction grating which couples an electromagnetic wave in a planer waveguide is disclosed. In addition, in IEEE Trans. Magn. Vol. 42, p 2417 (2006), a light guiding method in which light emitted from a laser unit provided in a drive is irradiated to a diffraction grating is proposed. In Japanese Unexamined Patent Application Publication No. 2005-317178, an invention of forming a slider by a semiconductor laser chip (GaAs substrate) itself is disclosed. In Japanese Patent No. 3231331 and U.S. Patent Application Publication No. 2008/0002298 specification, a configuration in which a surface emitting laser is mounted on an integrated surface and light is guided to a near-field light generation element section with use of a diffraction optical element (condenser lens or grating) is proposed. In addition, the applicants have proposed a head structure in which a laser diode holder unit (LDU) supporting a laser diode chip is formed, and the LDU is mounted on a back surface of a slider (on an opposite side of an air bearing surface) provided with a read element and a write element (Japanese Unexamined Patent Application Publication No. 2008-47268).

Incidentally, in the configuration in which one end surface of the waveguide is arranged to face a light source unit such as a laser diode, there is an issue of return light, that is, part of laser light emitted from the light source unit is reflected once on a light incident surface of the waveguide, and the reflected part of the laser light enters the light emission surface of the light source unit again. In this case, to improve the optical coupling efficiency, the gap between the light emission surface of the light source unit and the light incident surface of the waveguide is desirably small as much as possible. However, when the light emission surface of the light source unit is close to the light incident surface of the waveguide, the intensity of the return light described above is increased so that stable operation of the laser diode may be obstructed.

In view of the foregoing, it is desirable to provide a thermally-assisted magnetic recording head which is excellent in recording efficiency and is operable stably.

SUMMARY OF THE INVENTION

According to an embodiment of the invention, there is provided a thermally-assisted magnetic recording head, including: a laser light source having an emission surface, the emission surface allowing laser light to be emitted therefrom; a waveguide having a core and a cladding, the core allowing the laser light emitted from the laser light source to propagate therethrough, and the cladding surrounding the core; a magnetic pole; and a plasmon generator. Each of the core and the cladding has an end surface facing the emission surface. The end surface of the cladding suppresses returning of the laser light to the laser light source.

According to an embodiment of the invention, there are provided a head gimbal assembly, a head arm assembly, and a magnetic disk unit which include the above-described thermally-assisted magnetic recording head.

In the thermally-assisted magnetic recording head according to the embodiment of the invention and the head gimbal assembly, the head arm assembly, and the magnetic disk unit including the thermally-assisted magnetic recording head, the return light to the laser light source is allowed to be decreased so that the operation of the laser light source is stabilized. Therefore, variation in the intensity and the spot size of near-field light generated on an air bearing surface is suppressed, and thus magnetic recording with higher density is allowed to be stably performed.

The end surface of the cladding has a surface roughness greater than that of the end surface of the core, for example. In this case, the end surface of the core is preferably more projected toward the laser light source than the end surface of the cladding. In addition, the end surface of the cladding may include a first region which surrounds the outer edge of the end surface of the core and is included in a plane common to the end surface of the core, and a second region which is located outside of the first region while surrounding the outer edge of the first region and is recessed from the end surface of the core. In such a case, the first region desirably has an outside diameter larger than a mode field diameter of the waveguide. Moreover, the end surface of the cladding may be inclined relative to the end surface of the core so as to be separated away from the laser light source with increasing distance from the core. In such a case, an angle between the end surface of the cladding and the end surface of the core is preferably equal to or larger than 15 degrees. Alternatively, the end surface of the cladding may include a first region which surrounds the outer edge of the end surface of the core and is included in a plane common to the end surface of the core, and a second region which is located outside of the first region while surrounding the outer edge of the first region and is so inclined, relative to the end surface of the core, as to be separated away from the laser light source with increasing distance form the core. In such a case, an angle between the second region of the end surface of the cladding and the end surface of the core is preferably equal to or larger than 15 degrees. Also in this case, the first region preferably has an outside diameter larger than the mode field diameter of the waveguide.

According to an embodiment of the invention, there is provided a light transmission unit, including: a laser light source having an emission surface, the emission surface allowing laser light to be emitted therefrom; and a waveguide having a core and a cladding, the core allowing the laser light emitted from the laser light source to propagate therethrough, and the cladding surrounding the core. Each of the core and the cladding includes an end surface facing the emission surface, and the end surface of the cladding suppresses returning of the laser light to the laser light source.

In the light transmission unit according to the embodiment of the invention, since the return light to the laser light source is allowed to be decreased, operation of the laser light source is stabilized. Therefore, when the light transmission unit is used in a thermally-assisted magnetic recording head, for example, variation in the intensity and the spot size of near-field light generated in an air bearing surface is suppressed, and thus magnetic recording with higher density is allowed to be stably performed.

DETAILED DESCRIPTION OF THE PREFERRED EMBODIMENTS

Hereinafter, preferred embodiments of the invention will be described in detail with reference to drawings.

First Embodiment

[1. Configuration of Magnetic Disk Unit]

First, referring to FIG. 1 and FIG. 2, a configuration of a magnetic disk unit will be described below as a first embodiment of the invention.

Figure 1:
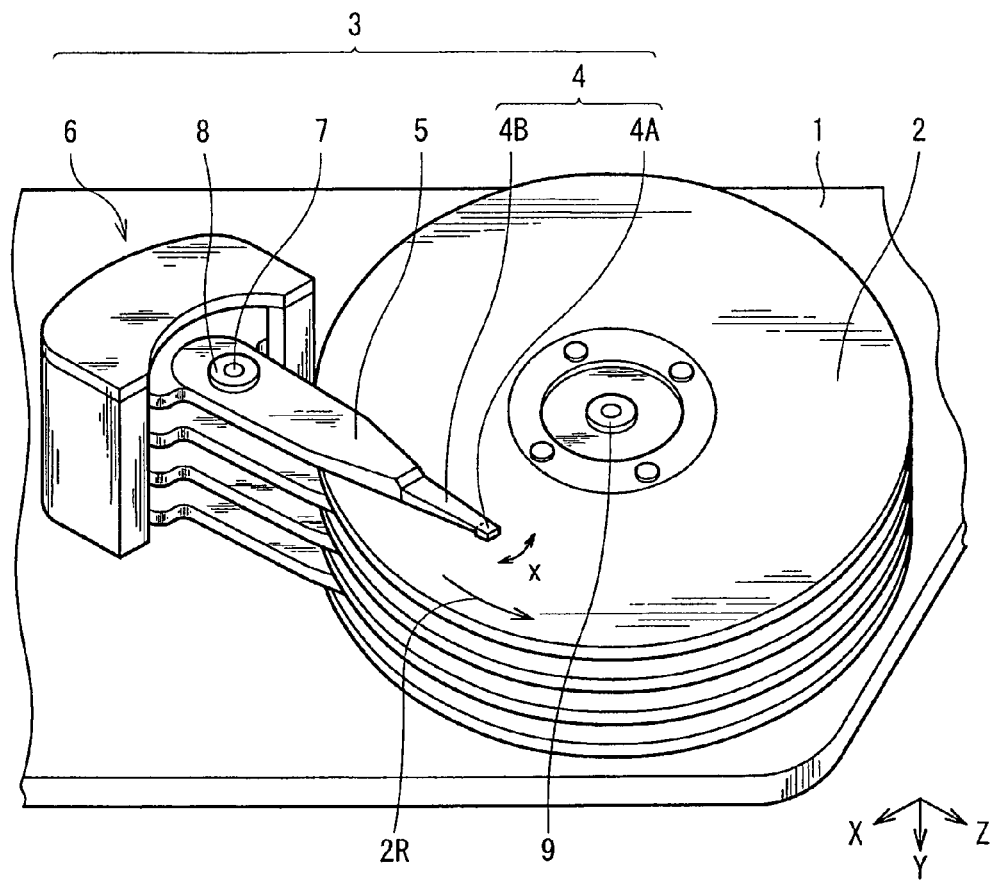
FIG. 1 is a perspective view illustrating a configuration of a magnetic disk unit provided with a thermally-assisted magnetic head according to a first embodiment of the invention.

FIG. 1 is a perspective view illustrating an internal configuration of the magnetic disk unit as the first embodiment. The magnetic disk unit adopts load/unload system as a driving system, and includes, for example, in a housing 1, a magnetic disk 2 as a magnetic recording medium in which information is to be written, and a head arm assembly (HAA) 3 for writing information in the magnetic disk 2 and reading the information. The HAA 3 is provided with a head gimbal assembly (HGA) 4, an arm 5 supporting a substrate of the HGA 4, and a driver 6 as a power source for rotating the arm 5. The HGA 4 includes a thermally-assisted magnetic head device (hereinafter, simply referred to as a "magnetic head device") 4A having a side surface provided with a magnetic read write head section 10 (described later) according to the embodiment, and a suspension 4B having an end provided with the magnetic head device 4A. The arm 5 supports the other end of the suspension 4B (an end opposite to the end provided with the magnetic head device 4A). The arm 5 is configured so as to be rotatable, through a bearing 8, around a fixed shaft 7 fixed to the housing 1. The driver 6 is configured of, for example, a voice coil motor. Incidentally, the magnetic disk unit has a plurality of (four in FIG. 1) magnetic disks 2, and the magnetic head device 4A is disposed correspondingly to recording surfaces (a front surface and a back surface) of each of the magnetic disks 2. Each magnetic head device 4A is allowed to move in a direction across write tracks, that is, in a track width direction (in X-axis direction) in a plane parallel to the recording surface of each magnetic disk 2. On the other hand, the magnetic disk 2 is configured to rotate around a spindle motor 9 fixed to the housing 1 in a rotation direction 2R substantially orthogonal to the X-axis direction. With the rotation of the magnetic disk 2 and the movement of the magnetic head device 4A, information is written into the magnetic disk 2 or stored information is read out from the magnetic disk 2. Further, the magnetic disk unit has a control circuit (described later) which controls a write operation and a read operation of the magnetic read write head section 10, and controls an emission operation of a laser diode as a light source which generates laser light used for thermally-assisted magnetic recording (described later).

Figure 2:
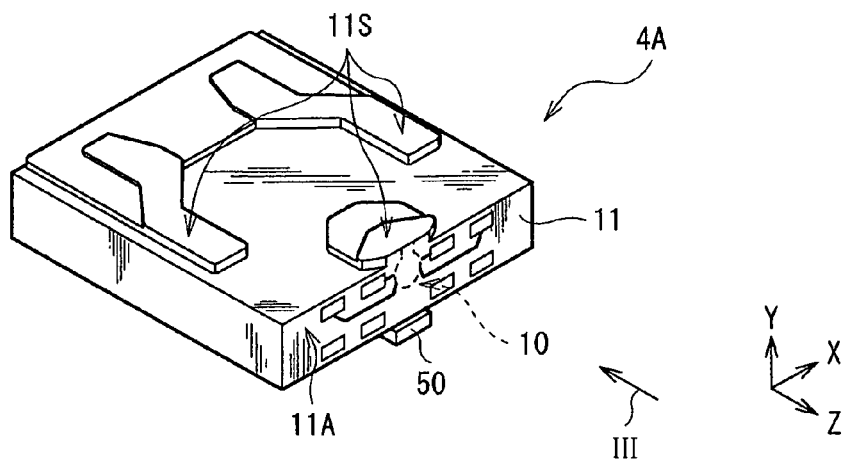
FIG. 2 is a perspective view illustrating a configuration of a thermally-assisted magnetic head device illustrated in FIG. 1.

FIG. 2 illustrates a configuration of the magnetic head device 4A illustrated in FIG. 1. The magnetic head device 4A has a block-shaped slider 11 made of, for example, $Al_2O_3 \cdot TiC$ (AlTiC). The slider 11 is substantially formed as a hexahedron, for example, and one surface thereof corresponds to an ABS 11S disposed oppositely and proximally to the recording surface of the magnetic disk 2. When the magnetic disk unit is not driven, namely, when the spindle motor 9 is stopped and the magnetic disk 2 does not rotate, the magnetic head device 4A is pulled off to the position away from the magnetic disk 2 (unload state), in order to prevent contact of the ABS 11S and the recording surface. In contrast, when the magnetic disk unit is initiated, the magnetic disk 2 starts to rotate at a high speed by the spindle motor 9, and the arm 5 is rotationally moved around the fixed shaft 7 by the driver 6. Therefore, the magnetic head device 4A moves above the front surface of the magnetic disk 2, and is in a load state. The rotation of the magnetic disk 2 at a high speed leads to air flow between the recording surface and the ABS 11S, and lift force caused by the air flow leads to a state where the magnetic head device 4A floats to maintain a certain distance (magnetic spacing) MS (in FIG. 5 described later) along a direction (Y-axis direction) orthogonal to the recording surface. In addition, on the element forming surface 11A that is one side surface orthogonal to the ABS 11S, the magnetic read write head section 10 is provided. Incidentally, on a surface 11B opposite to the ABS 11S of the slider 11, a light source unit 50 is provided near the magnetic read write head section 10.

[2. Detailed Configuration of Magnetic Read Write Head Section]

Figure 3:
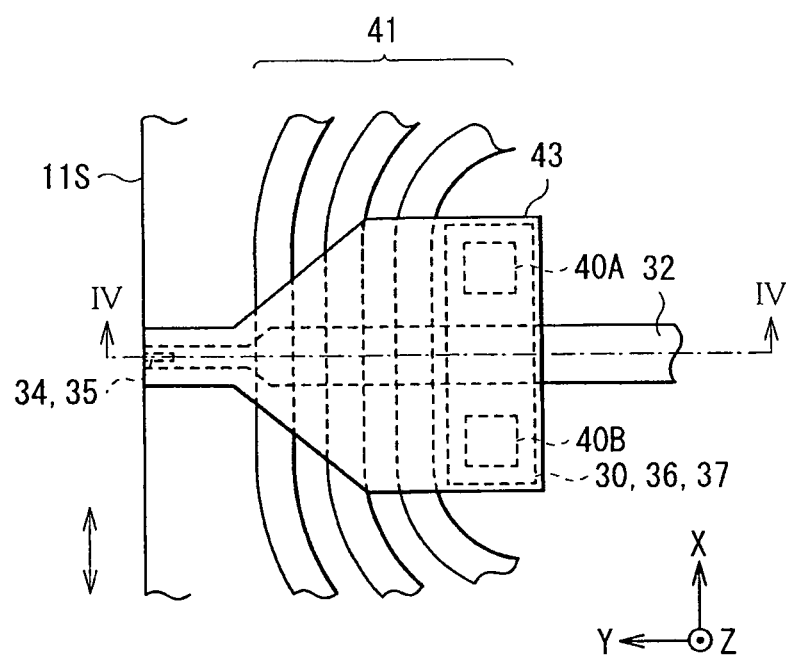
FIG. 3 is a plan view illustrating a configuration of a main part of a magnetic read write head viewed from an arrow III direction illustrated in FIG. 2.
Figure 4:
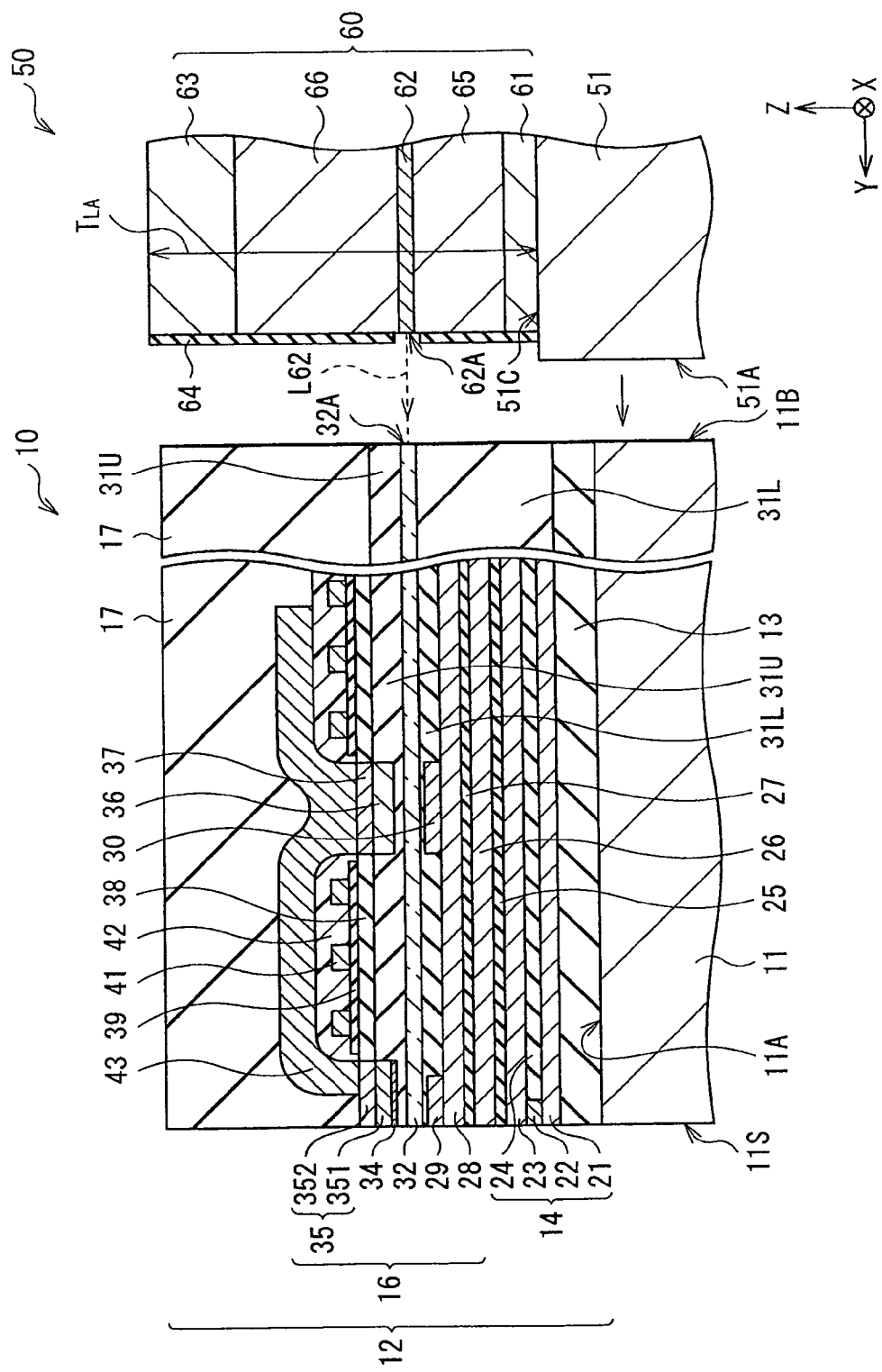
FIG. 4 is a sectional view illustrating a configuration of the magnetic read write head viewed from an arrow direction along a IV-IV line illustrated in FIG. 3.
Figure 5:
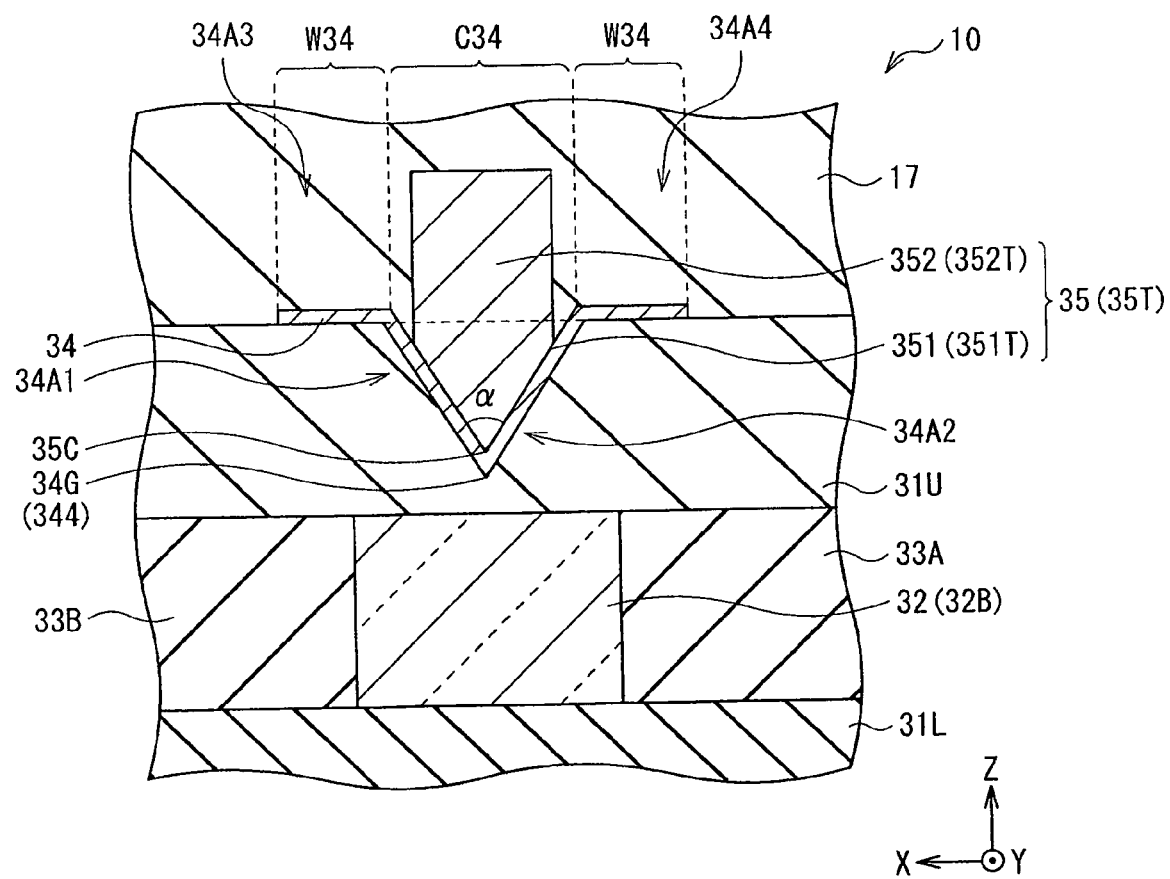
FIG. 5 is a plan view illustrating a configuration of an end surface exposed on an air bearing surface, of the main part of a magnetic read write head section.

Next, the magnetic read write head section 10 is described in more detail with reference to FIG. 3 to FIG. 5. FIG. 3 is a plan view of the magnetic read write head section 10 viewed from a direction of an arrow III illustrated in FIG. 2, FIG. 4 is a sectional view illustrating a configuration thereof in an arrow direction along a IV-IV line illustrated in FIG. 3, and FIG. 5 illustrates a part of an end surface, exposed on the ABS 11S, of the magnetic read write head section 10 in an enlarged manner. The magnetic read write head section 10 has a stacked structure including an insulating layer 13, a read head section 14, a write head section 16, and a cladding layer 17 which are embedded in an element forming layer 12 provided on a substrate 11 and are stacked in order on the substrate 11. Each of the read head section 14 and the write head section 16 has an end surface exposed on the ABS 11S.

The read head section 14 performs a read process using magneto-resistive effect (MR). The read head section 14 is configured by stacking, for example, a lower shield layer 21, an MR element 22, and an upper shield layer 23 in this order on the insulating layer 13.

The lower shield layer 21 and the upper shield layer 23 are respectively formed of a soft magnetic metal material such as NiFe (nickel iron alloy), and are disposed to face each other with the MR element 22 in between in the stacking direction (in Z-axis direction). As a result, the lower shield layer 21 and the upper shield layer 23 each exhibit a function to protect the MR element 22 from the influence of unnecessary magnetic field.

One end surface of the MR element 22 is exposed on the ABS 11S, and the other end surfaces thereof are in contact with an insulating layer 24 filling a space between the lower shield layer 21 and the upper shield layer 23. The insulating layer 24 is formed of an insulating material such as $Al_2O_3$ (aluminum oxide), AlN (aluminum nitride), $SiO_2$ (silicon dioxide), and DLC (diamond-like carbon).

The MR element 22 functions as a sensor for reading magnetic information written in the magnetic disk 2. Note that in the embodiment, in a direction (Y-axis direction) orthogonal to the ABS 11S, a direction toward the ABS 11S with the MR element 22 as a base or a position near the ABS 11S is called "front side". A direction toward opposite side from the ABS 11S with the MR element 22 as a base or a position away from the ABS 11S is called "back side". The MR element 22 is, for example, a CPP (current perpendicular to plane)-GMR (giant magnetoresistive) element whose sense current flows inside thereof in a stacking direction. The lower shield layer 21 and the upper shield layer 23 each function as an electrode to supply the sense current to the MR element 22.

In the read head section 14 with such a structure, a magnetization direction of a free layer (not illustrated) included in the MR element 22 changes depending on a signal magnetic field from the magnetic disk 2. Thus, the magnetization direction of the free layer shows a change relative to a magnetization direction of a pinned layer (not illustrated) also included in the MR element 22. When the sense current is allowed to flow through the MR element 22, the relative change in the magnetization direction appears as the change of the electric resistance. Therefore, the read head section 14 detects the signal magnetic field using the change to read the magnetic information.

On the read head section 14, an insulating layer 25, an intermediate shield layer 26, and an insulating layer 27 are stacked in order. The intermediate shield layer 26 functions to prevent the MR element 22 from being affected by a magnetic field which is generated in the write head section 16, and is formed of, for example, a soft magnetic metal material such as NiFe. The insulating layers 25 and 27 are formed of the similar material to the insulating layer 24, for example.

The write head section 16 is a perpendicular magnetic recording head performing a write process of thermally-assisted magnetic recording system. The write head section 16 has, for example, a lower yoke layer 28, a leading shield 29 and a connecting layer 30, a cladding 31L, a core 32, claddings 33A and 33B, and a cladding 31U in order on the insulating layer 27. The claddings 33A and 33B configure a first cladding pair sandwiching the waveguide 32 in the track-width direction (in the X-axis direction). On the other hand, the claddings 31L and 31U configure a second cladding pair sandwiching the core 32 in the thickness direction (in the Z-axis direction). Note that the leading shield 29 may be omitted from the structure.

The core 32 is formed of a dielectric material allowing laser light to pass therethrough. Examples of the constituent material of the core 32 include SiC, DLC, TiOx (titanium oxide), TaOx (tantalum oxide), SiNx (silicon nitride), SiOxNy (silicon oxynitride), Si (silicon), ZnSe (zinc selenide), NbOx (niobium oxide), GaP (gallium phosphide), ZnS (zinc sulfide), ZnTe (zinc telluride), CrOx (chromium oxide), FeOx (iron oxide), CuOx (copper oxide), SrTiOx (strontium titanate), BaTiOx (barium titanate), Ge (germanium), and C (diamond). The claddings 33A, 33B, 31L, and 31U are formed of a dielectric material having a refractive index, with respect to laser light propagating through the core 32, lower than that of a constituent material of the core 32. In terms of the refractive index with respect to laser light propagating through the core 32, the dielectric material constituting the claddings 33A and 33B and the dielectric material constituting the claddings 31L and 31U may be the same or different from each other. Examples of the dielectric material constituting the claddings 33A, 33B, 31L, and 31U include SiOx (silicon oxide), $Al_2O_3$ (aluminum oxide), AlN (aluminum nitride), and $Al_2O_3$. The core 32 configures a waveguide, together with the claddings 33A, 33B, 31L, 31U, and the like which surround the core 32. The waveguide allows laser light from a laser diode 60 (described later) to propagate toward the ABS 11S.

The lower yoke layer 28, the leading shield 29, and the connecting layer 30 are each made of a soft magnetic metal material such as NiFe. The leading shield 29 is located at the frontmost end of the upper surface of the lower yoke layer 28 so that one end surface of the leading shield 29 is exposed on the ABS 11S. The connecting layer 30 is located at the rear of the leading shield 29 on the upper surface of the lower yoke layer 28. The cladding 31L is made of a dielectric material having a refractive index, with respect to laser light propagating through the waveguide 32, lower than that of the core 32, and is provided to cover the lower yoke layer 28, the leading shield 29, and the connecting layer 30. The core 32 provided on the cladding 31L extends in a direction (Y-axis direction) orthogonal to the ABS 11S, and has a front end surface 32B (FIG. 5) exposed on the ABS 11S and a rear end surface 32A (FIG. 4) exposed at the opposite side from the ABS 11S. Note that the front end surface 32B of the core 32 may be located at a receded position from the ABS 11S without being exposed on the ABS 11S. In the core 32, the shape of a cross-section parallel to the ABS 11S is, for example, a rectangular shape, but may be other shapes.

The write head section 16 further includes a plasmon generator 34 provided above the front end of the core 32 through the cladding 31U, and a magnetic pole 35 provided to be in contact with the upper surface of the plasmon generator 34. The plasmon generator 34 and the magnetic pole 35 are arranged so that one end surface of each of the plasmon generator 34 and the magnetic pole 35 is exposed on the ABS 11S. The magnetic pole 35 has a structure in which a first layer 351 and a second layer 352 are stacked in order on the plasmon generator 34, for example. Both the first layer 351 and the second layer 352 are formed of a magnetic material with high saturation flux density such as iron-based alloy. Examples of the iron-based alloy include FeCo (iron cobalt alloy), FeNi (iron nickel alloy), and FeCoNi (iron cobalt nickel alloy). The plasmon generator 34 generates near-field light NF (described later) from the ABS 11S, based on the laser light which has propagated through the core 32. The magnetic pole 35 stores therein magnetic flux generated in a coil 41 (described later), releases the magnetic flux from the ABS 11S, thereby generating a write magnetic field for writing magnetic information into the magnetic disk 2. The plasmon generator 34 and the first layer 351 are embedded in the cladding layer 33.

The write head section 16 further includes a connecting layer 36 embedded in the cladding layer 33 at the rear of the plasmon generator 34 and the magnetic pole 35, and a connecting layer 37 provided to be in contact with the upper surface of the connecting layer 36. Both the connecting layers 36 and 37 are arranged above the connecting layer 30 and are formed of a soft magnetic metal material such as NiFe.

The write head section 16 includes two connecting sections 40A and 40B (FIG. 3) which are embedded in the claddings 31U, 33A, and 33B. The connecting sections 40A and 40B are also formed of a soft magnetic metal material such as NiFe. The connecting sections 40A and 40B extend in the Z-axis direction so as to connect the connecting layer 30 and the connecting layer 36, and are arranged in the X-axis direction so as to sandwich the core 32 with a distance.

As illustrated in FIG. 4, on the cladding 31U, an insulating layer 38 is provided to fill a space around the second layer 352 of the magnetic pole 35. An insulating layer 39 and the coil 41 which is formed in spiral around the connecting layer 37 are stacked in order on the insulating layer 38. The coil 41 is intended to generate magnetic flux for writing by flow of a write current, and is formed of a highly conductive material such as Cu (copper) and Au (gold). The insulating layers 38 and 39 are configured of an insulating material such as $Al_2O_3$, AlN, $SiO_2$, or DLC. The insulating layers 38 and 39 and the coil 41 are covered with an insulating layer 42, and an upper yoke layer 43 is further provided to cover the insulating layer 42. The insulating layer 42 is configured of, for example, a non-magnetic insulating material flowing on heating, such as a photoresist or a spin on glass (SOG). The insulating layers 38, 39, and 42 electrically separate the coil 41 from other nearby devices. The upper yoke layer 43 is formed of a soft magnetic material with high saturation flux density such as CoFe, the front portion thereof is connected to the second layer 352 of the magnetic pole 35, and a part of the rear portion is connected to the connecting layer 37. In addition, the front end surface of the upper yoke layer 43 is located at a receded position from the ABS 11S.

In the write head section 16 with such a structure, by the write current flowing through the coil 41, magnetic flux is generated inside a magnetic path which is mainly configured by the leading shield 29, the lower yoke layer 28, the connecting layer 30, the connecting sections 40A and 40B, the connecting layers 36 and 37, the upper yoke layer 43, and the magnetic pole 35. Accordingly, a signal magnetic field is generated near the end surface of the magnetic pole 35 exposed on the ABS 11S, and the signal magnetic field reaches a predetermined region of the recording surface of the magnetic disk 2.

Further, in the magnetic read write head section 10, for example, the cladding 17 made of similar material to the cladding 31U is formed to cover the entire upper surface of the write head section 16.

Figure 6:
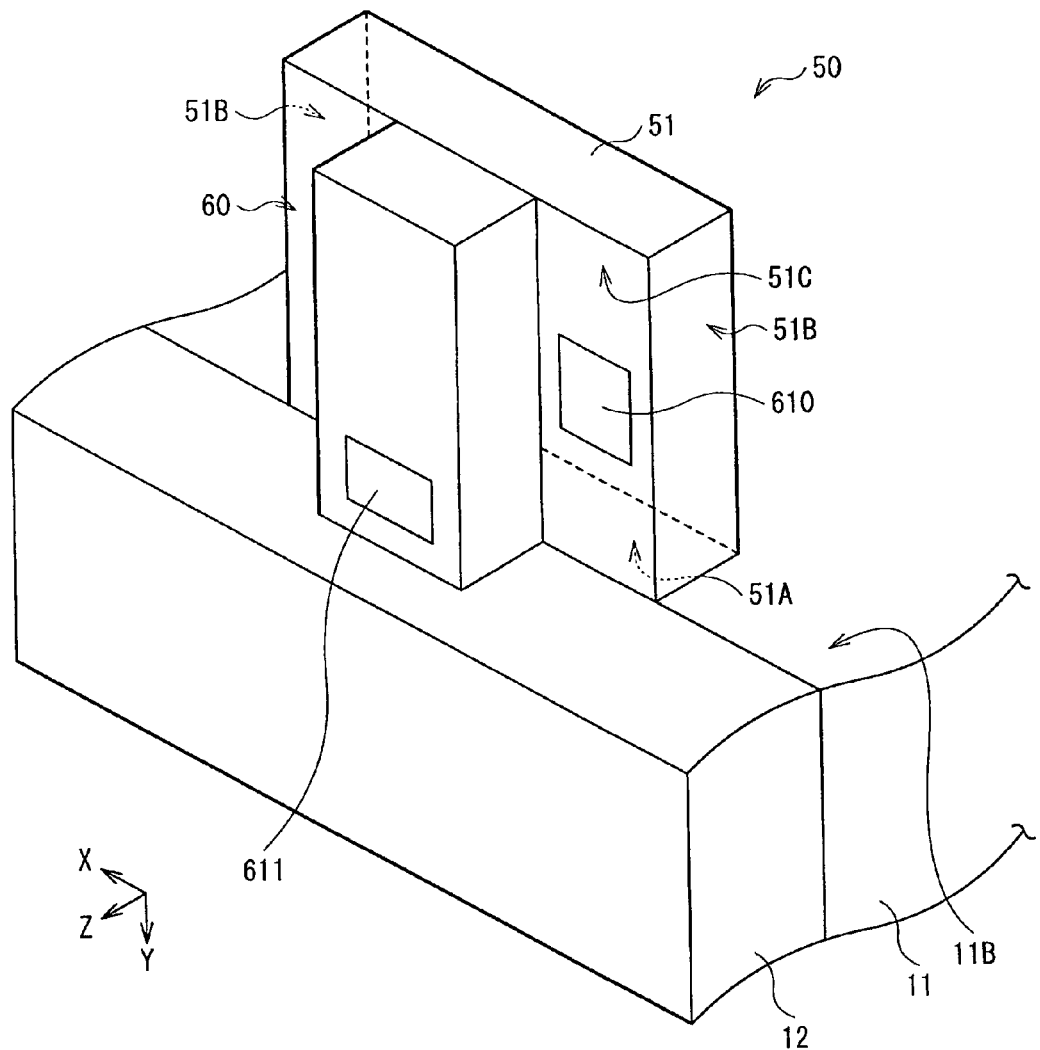
FIG. 6 is a perspective view illustrating a schematic overall configuration of a light source unit illustrated in FIG. 1.

The light source unit 50 provided at the rear of the magnetic read write head section 10 includes the laser diode 60 as a light source emitting laser light, and a rectangular-solid supporting member 51 supporting the laser diode 60, as illustrated in FIG. 6. Note that FIG. 6 is a perspective view illustrating a schematic overall configuration of the light source unit 50.

The supporting member 51 is formed of, for example, a ceramic material such as $Al_2O_3$.TiC. As illustrated in FIG. 4, the supporting member 51 includes a bonding surface 51A to be adhered to a back surface 11B of the slider 11, and a light source mounting surface 51C orthogonal to the bonding surface 51A. The light source mounting surface 51C is parallel to the element forming surface 11A, and the laser diode 60 is mounted on the light source mounting surface 51C. The supporting member 51 desirably has a function of a heatsink dissipating heat generated by the laser diode 60, in addition to the function to support the laser diode 60.

Laser diodes generally used for communication, for optical disc storage, or for material analysis, for example, InP-based, GaAs-based, or GaN-based laser diodes, may be used as the laser diode 60. The wavelength of the laser light emitted from the laser diode 60 may be any value within the range of, for example, 375 nm to 1.7 μm. Specifically, examples of such a laser diode include a laser diode of InGaAsP/InP quaternary mixed crystal with the emission wavelength region of 1.2 to 1.67 μm. As illustrated in FIG. 4, the laser diode 60 has a multilayer structure including a lower electrode 61, an active layer 62, and an upper electrode 63. For example, an n-type semiconductor layer 65 including n-type AlGaN is inserted between the lower electrode 61 and the active layer 62, and for example, a p-type semiconductor layer 66 including p-type AlGaN is inserted between the active layer 62 and the upper electrode 63. On each of two cleavage surfaces of the multilayer structure, a reflective layer 64 formed of $SiO_2$, $Al_2O_3$, or the like is provided to totally reflect light and excite oscillation. In the reflective layer 64, an aperture for emitting laser light is provided at a position including an emission center 62A of the active layer 62. The relative positions of the light source unit 50 and the magnetic read write head section 10 are fixed by adhering the bonding surface 51A of the supporting member 51 to the back surface 11B of the slider 11 so that the emission center 62A and the rear end surface 32A of the core 32 are coincident with each other. The thickness $T_{LA}$ of the laser diode 60 is, for example, within a range of about 60 to 200 μm. A predetermined voltage is applied between the lower electrode 61 and the upper electrode 63 so that laser light is emitted from the emission center 62A of the active layer 62, and then enters the rear end surface 32A of the core 32. The laser light emitted from the laser diode 60 is preferably polarized light of a TM mode whose electric field oscillates in a direction perpendicular to the surface of the active layer 62. The laser diode 60 may be driven with use of a power source in the magnetic disk unit. The magnetic disk unit generally includes a power source generating a voltage of about 5 V, for example, and the voltage generated by the power source is sufficient to drive the laser diode 60. In addition, the laser diode 60 consumes power of about several tens mW, which may be sufficiently covered by the power source in the magnetic disk unit.

Figure 7A:
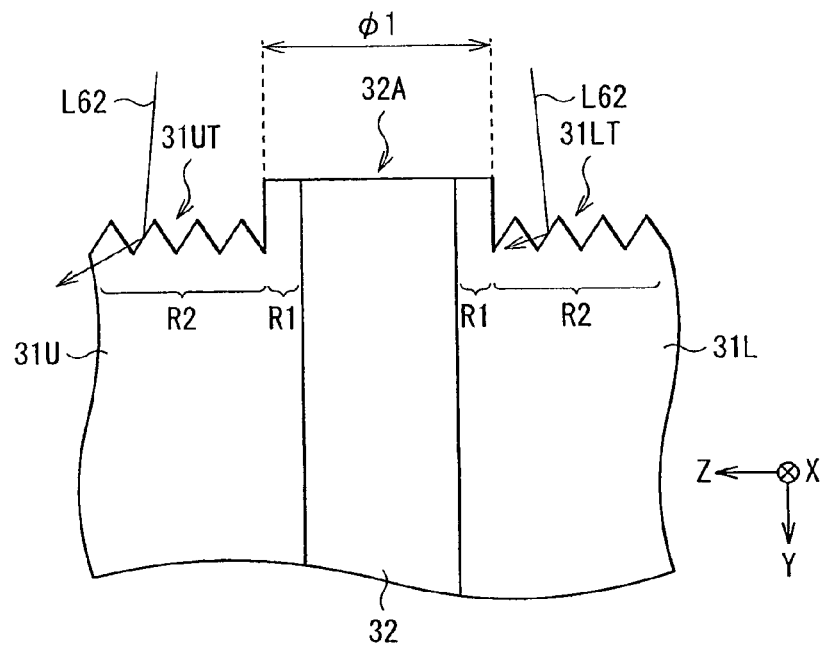
FIGS. 7A and 7B are enlarged sectional views each illustrating the periphery of a rear end surface of a waveguide of the magnetic read write head section.
Figure 7B:
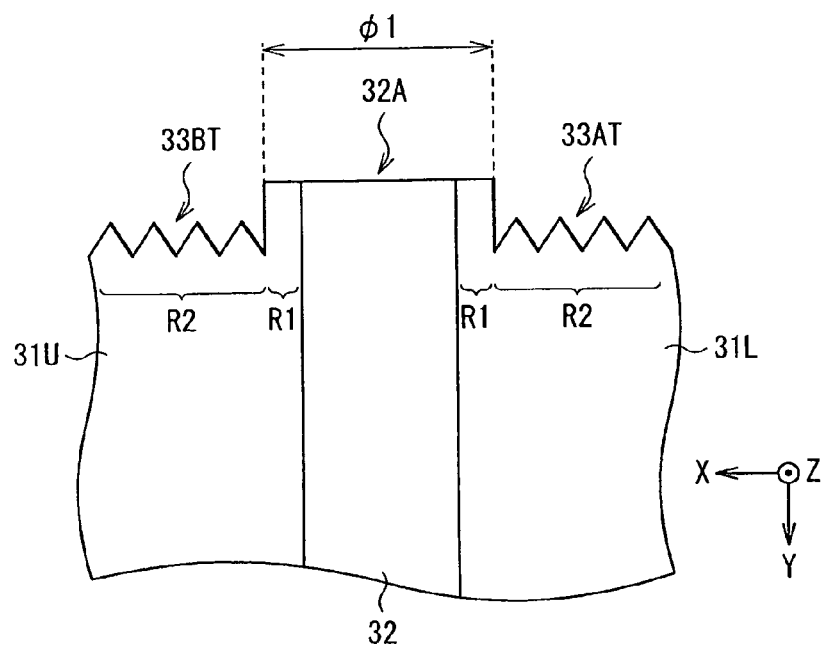
Figure 8:
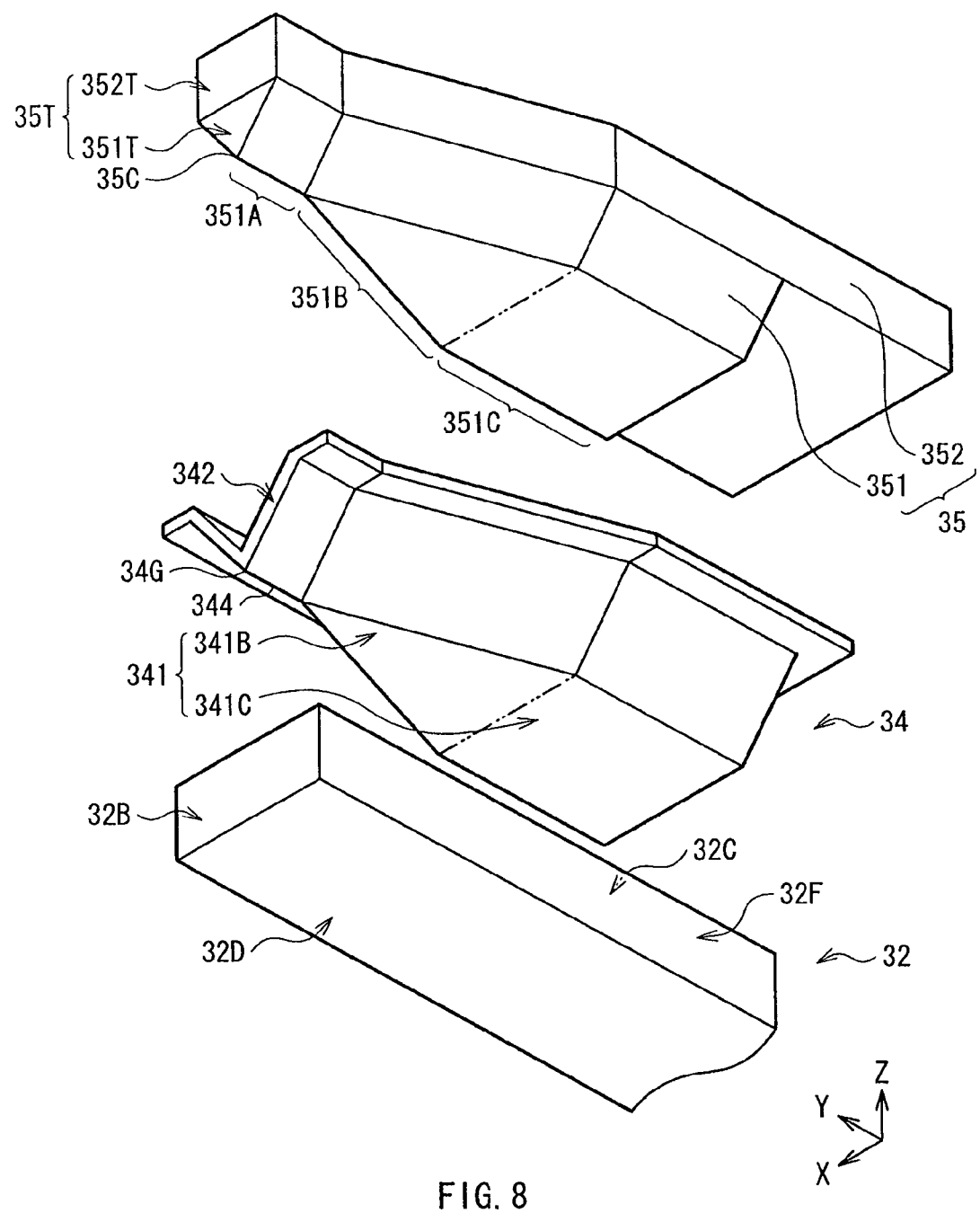
FIG. 8 is an exploded perspective view illustrating a configuration of a main part of the magnetic read write head.
Figure 9:
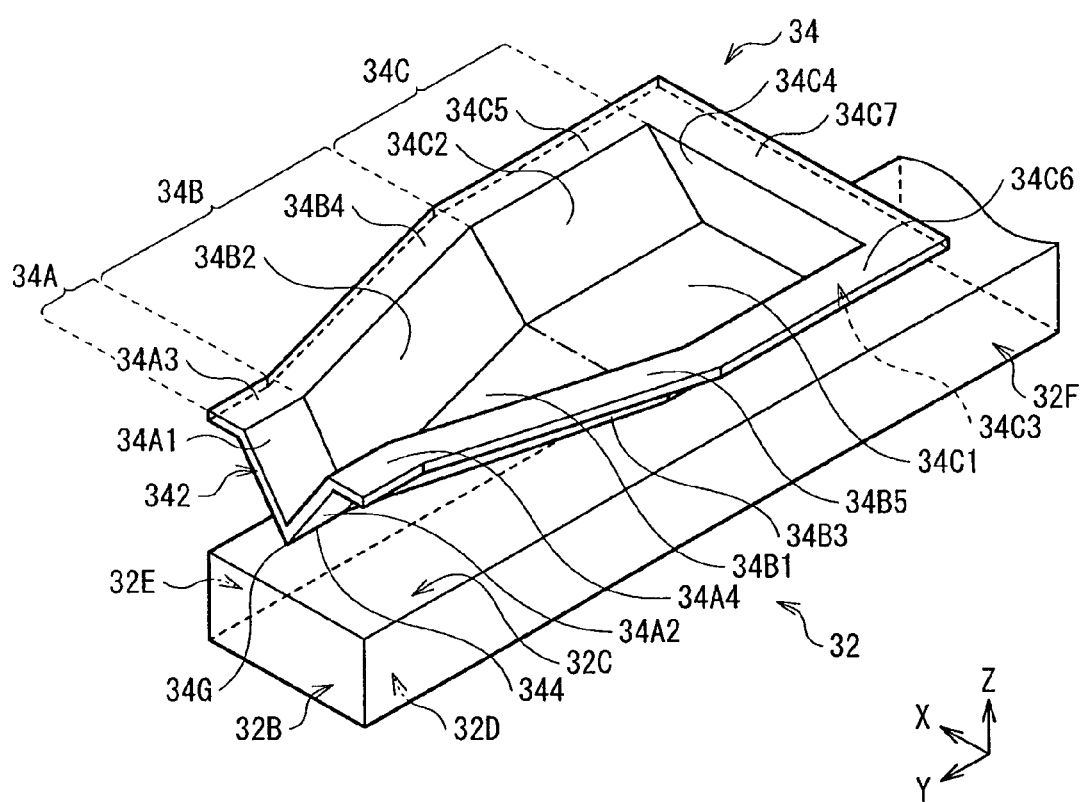
FIG. 9 is another perspective view illustrating the configuration of the main part of the magnetic read write head.
Figure 10:
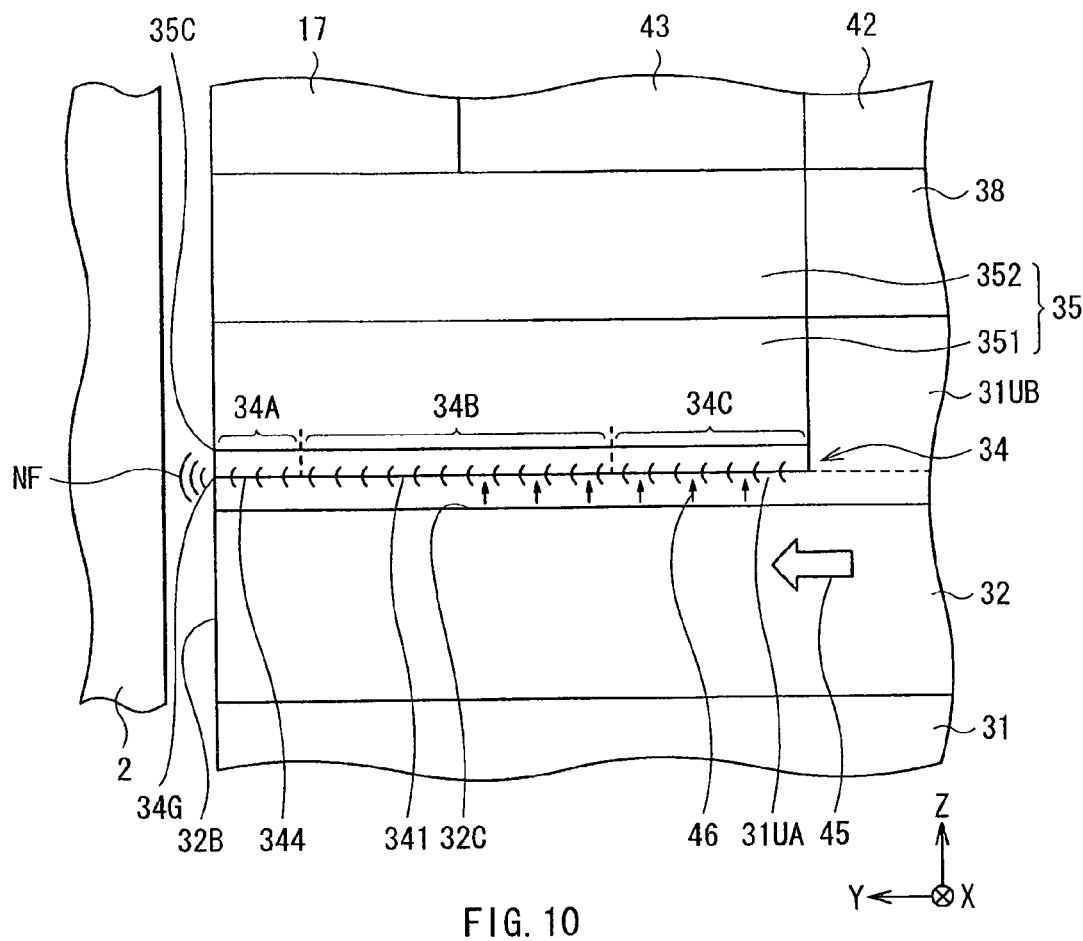
FIG. 10 is a sectional view illustrating a configuration of a cross-section orthogonal to the air bearing surface, of the main part of the magnetic read write head.
Figure 11:
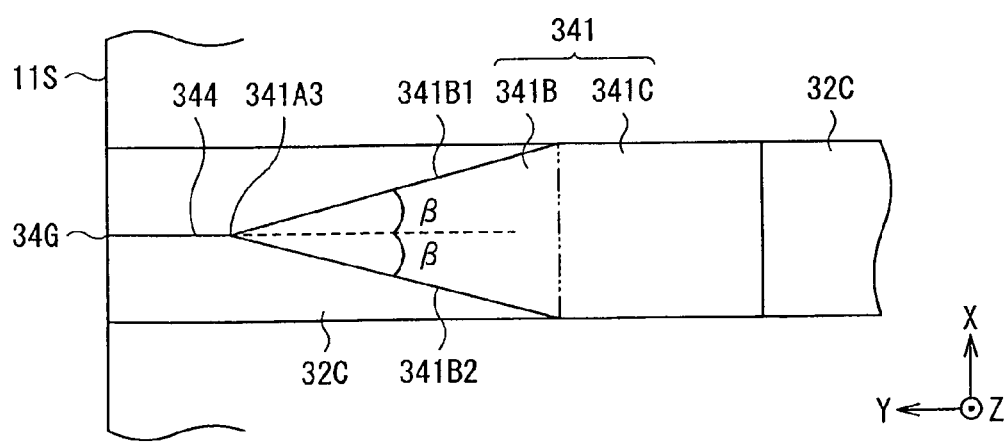
FIG. 11 is a plan view illustrating the main part of the magnetic read write head.

Next, referring to FIG. 7 to FIG. 11 in addition to FIG. 5, the configurations and the functions of the core 32, the plasmon generator 34, and the magnetic pole 35 will be described in detail. FIG. 7 is a schematic view illustrating the periphery of an opposed surface of the waveguide including the rear end surface 32A of the core 32, opposed to an emission surface of laser light L62 of the laser diode 60. More specifically, FIG. 7A illustrates an YZ cross-section and FIG. 7B illustrates an XY cross-section. FIG. 8 is an exploded perspective view illustrating a configuration of the core 32, the plasmon generator 34, and the magnetic pole 35, and FIG. 9 is a perspective view illustrating the shape and the positional relationship of the core 32 and the plasmon generator 34. FIG. 10 is a sectional view illustrating the configurations and the functions of the core 32, the plasmon generator 34, and the magnetic pole 35, and the illustrated cross-section is orthogonal to the ABS 11S. FIG. 11 is a plan view illustrating the main part of the plasmon generator 34 viewed from the top side.

As described above, the core 32 and the claddings 33A, 33B, 31L, and 31U which surround the core 32 configure the waveguide allowing the laser light L62 from the laser diode 60 to propagate toward the ABS 11S. The opposed surfaces of the waveguide have a return-light preventing structure. This structure suppresses returning of the laser light L62 from the laser diode 60 to the laser diode 60 after reflection. Specifically, as illustrated in FIGS. 7A and 7B, on each of rear end surfaces 31LT, 31UT, 33AT, and 33BT, a first region R1 and a second region R2 are provided. The first region R1 surrounds an outer edge of the rear end surface 32A of the core 32, and the second region R2 surrounds the periphery of the first region R1. Herein, each of the rear end surfaces 31LT, 31UT, 33AT, and 33BT in the second region R2 has an irregular shape, and the surface roughness thereof is greater than that of the rear end surface 32A of the core 32. Therefore, the laser light irradiated to the second region R2 is to be scattered. The surface roughness of the second region R2 is adjusted through formation of concave sections on the surface by various kinds of etching, for example. In addition, each of the rear end surfaces 31LT, 31UT, 33AT, and 33BT in the second region R2 may have a shape in which concave sections and convex sections are periodically arranged in in-plane direction, or may have a shape in which concave sections and convex sections are irregularly arranged in the in-plane direction. Furthermore, the rear end surface 32A of the core 32 is more projected toward the laser diode 60 than the rear end surfaces 31LT, 31UT, 33AT, and 33BT of the claddings 31L, 31U, 33A, and 33B. Technically, the rear end surfaces 31LT, 31UT, 33AT, and 33BT in the second region R2 are located at positions receded from the rear end surface 32A of the core 32. In other words, the rear end surfaces 31LT, 31UT, 33AT, and 33BT in the first region R1 are included in a plane common to the rear end surface 32A of the core 32. An outer diameter φ1 of the first region R1 is larger than a mode field diameter of the waveguide in order to avoid impairing of propagation efficiency of laser light 45 (described later) in the core 32.

As illustrated in FIG. 8, for example, the core 32 includes a front end surface 32B closer to the ABS 11S, an evanescent light generating surface 32C as an upper surface, a lower surface 32D, and two side surfaces 32E and 32F, besides the rear end surface 32A illustrated in FIG. 4. The evanescent light generating surface 32C generates evanescent light based on the laser light propagating through the waveguide 32. In FIG. 8 to FIG. 11, although the case where the end surface 32B is arranged on the ABS 11S is exemplified, the front end surface 32B may be arranged at a position away from the ABS 11S.

As illustrated in FIG. 8, the plasmon generator 34 has a first portion 34A, a second portion 34B, and a third portion 34C in order from the ABS 11S side. In FIG. 8, the boundary between the second portion 34B and the third portion 34C is indicated by a two-dot chain line. Examples of the constituent material of the plasmon generator 34 include a conductive material containing one or more of Pd (palladium), Pt (platinum), Rh (rhodium), Ir (iridium), Ru (ruthenium), Au (gold), Ag (silver), Cu (copper), and Al (aluminum). Here, the constituent materials of the lower layer 34L and the upper layer 34U may be the same kind or different kinds.

As illustrated in FIG. 5, for example, the first portion 34A has a V-shaped mid-portion C34 including an edge 344 which is projected toward the core 32 on a cross-section parallel to the ABS 11S, and a pair of wing portions W34 facing each other with the mid-portion C34 in between in the track width direction (in the X-axis direction). In this case, the shape of the cross-section of the first portion 34A parallel to the ABS 11S is uniform irrespective of a distance from the ABS 11S.

As illustrated in FIG. 5, a V-shaped groove is provided in the mid-portion C34 of the first portion 34A. In other words, a pair of sidewalls 34A1 and 34A2 which respectively extend in a direction orthogonal to the ABS 11S is connected with each other at the edge 344 so as to form a V-shape having a vertex angle α on a cross-section parallel to the ABS 11S. To increase generation efficiency of the near-field light, the vertex angle α is preferably within a range of about 55 degrees to 75 degrees, for example. The edge 344 is a boundary portion between the pair of sidewalls 34A1 and 34A2, and extends in the Y-axis direction from a tip portion 34G exposed on the ABS 11S to the second portion 34B. The tip portion 34G is a portion generating near-field light. The edge 344 faces the evanescent light generating surface 32C of the core 32, and the sidewalls 34A1 and 34A2 are inclined so that the relative distance therebetween in the X-axis direction becomes wider with increasing distance from the core 32 with the edge 344 being a base point.

In the wing portions W34 of the first portion 34A, a pair of fringes 34A3 and 34A4 is provided so that one end of each of the fringes 34A3 and 34A4 in the X-axis direction is connected to an end portion of the sidewalls 34A1 and 34A2 on the opposite side from the edge 344, respectively. The pair of the fringes 34A3 and 34A4 are orthogonal to the ABS 11S, for example, and extend along a plane (XY-plane) parallel to the X-axis direction. The sidewalls 34A1 and 34A2 and the fringes 34A3 and 34A4 have a front end surface 342 exposed on the ABS 11S (FIG. 8 and FIG. 9). The first portion 34A has a uniform thickness over the mid-portion C34 and the pair of wing portions W34.

As illustrated in FIG. 9, the second portion 34B has a plate-like bottom portion 34B1 facing the evanescent light generating surface 32C, two plate-like sidewalls 34B2 and 34B3, and fringes 34B4 and 34B5. The bottom portion 34B1 is configured so that the width in the X-axis direction is zero at the boundary portion with the first portion 34A, and becomes wider with increasing distance from the ABS 11S. The sidewalls 34B2 and 34B3 are provided upright, at both end edge of the bottom portion 34B1 in the X-axis direction, toward the side opposite to the waveguide 32. Here, the sidewalls 34B2 and 34B3 are inclined so that the relative distance (a distance in the X-axis direction) therebetween becomes wider with increasing distance from the waveguide 32 with the portion connected to the bottom portion 34B1 being a base point. In addition, the sidewalls 34B2 and 34B3 are connected to the sidewalls 34A1 and 34A2 of the first portion 34A, respectively. Further, the fringes 34B4 and 34B5 are connected to an end portion of the sidewalls 34B2 and 34B3 on the opposite side from the bottom portion 34B1, respectively, and also connected to the fringes 34A3 and 34A4 of the first portion 34A, respectively. Moreover, in the sidewalls 34B2 and 34B3 and the fringes 34B4 and 34B5, the cross-sections orthogonal to the corresponding extending direction preferably have the similar shapes to those of the cross-sections of the sidewalls 34A1 and 34A2 and the fringes 34A3 and 34A4 of the first portion 34A, respectively.

The third portion 34C includes a bottom portion 34C1, sidewalls 34C2 and 34C3, a wall 34C4, and fringes 34C5, 34C6, and 34C7. The bottom portion 34C1 is provided so as to extend continuously from the bottom portion 34B1 of the second portion 34B in the XY-plane. The sidewalls 34C2 and 34C3 are respectively connected to the sidewalls 34B2 and 34B3 of the second portion 34B, and extend to be orthogonal to the ABS 11S. The sidewalls 34C2 and 34C3 are inclined so that the relative distance (the distance in the X-axis direction) therebetween becomes wider with increasing distance from the waveguide 32, with the connecting portion to the bottom portion 34C1 being a base point. The wall 34C4 couples the bottom portion 34C1 and the rear end portion of each of the sidewalls 34C2 and 34C3. The fringes 34C5 and 34C6 are respectively coupled to the fringes 34B4 and 34B5 of the second portion 34B, and extend to be orthogonal to the ABS 11S. The fringe 34C7 couples the fringes 34C5 and 34C6 and the rear end portion of the wall 34C4. The cross-section of each of the sidewalls 34C2 and 34C3 and the fringes 34C5 and 34C6, which is orthogonal to the corresponding extending direction, preferably have the similar shape to that of the cross-section of each of the sidewalls 34A1 and 34A2 and the fringes 34A3 and 34A4 of the first portion 34A, for example. Note that the wall 34C4 and the fringe 34C7 may not be provided.

As illustrated in FIG. 8 and FIG. 9, the first portion 34A, the second portion 34B, and the third portion 34C form a space inside thereof for containing the first layer 351 of the magnetic pole 35.

The surfaces of the bottom portions 34B1 and 34C1 facing the evanescent light generating surface 32C of the core 32 with a predetermined distance are a first surface 341B and a second surface 341C which form a surface plasmon exciting surface 341 as illustrated in FIG. 8. In FIG. 8, the boundary between the first surface 341B and the second surface 341C is indicated by a two-dot chain line.

The magnetic pole 35 has an end surface 35T exposed on the ABS 11S as illustrated in FIG. 5 and FIG. 8. The end surface 35T includes an end surface 351T exposed at the ABS 11S in the first layer 351, and an end surface 352T exposed on the ABS 11S in the second layer 352.

The first layer 351 of the magnetic pole 35 is contained in a space formed by the first portion 34A, the second portion 34B, and the third portion 34C of the plasmon generator 34. Specifically, the first layer 351 has a first portion 351A occupying a space formed by the first portion 34A, a second portion 351B occupying a space formed by the second portion 34B, and a third portion 351C occupying a space formed by the third portion 34C. The first portion 351A has a triangular prism shape closely being in contact with the sidewalls 34A1 and 34A2 of the first portion 34A of the plasmon generator 34, and the area of the cross-section parallel to the ABS 11S is constant. In the X-axis direction, the width of the first portion 351A is desirably smaller than that of the front end surface 32B of the core 32. Furthermore, the width of the first portion 351A is desirably smaller than that of the mid-portion C34 of the first portion 34A. This is because the maximum intensity of the write magnetic field from the magnetic pole 35 is increased in both cases. In addition, the end surface 351T of the first portion 351A has an end 35C located at a vertex opposite to the second layer 352.

The second portion 351B is closely in contact with the sidewalls 34B2 and 34B3 and the bottom portion 34B1 of the second portion 34B of the plasmon generator 34. The width of the second portion 351B becomes wider with increasing the distance from the ABS 11S in the X-axis direction, and becomes wider with increasing the distance from the core 32 in the Z-axis direction. The third portion 351C is closely in contact with the sidewalls 34C2 and 34C3 and the bottom portion 34C1 of the third portion 34C of the plasmon generator 34. The width of the third portion 351C in X-axis direction is constant in the Y-axis direction, and becomes wider with increasing the distance from the core 32 in the Z-axis direction.

As illustrated in FIG. 10, in the cladding 31U, a portion disposed between the evanescent light generating surface 32C and the surface plasmon exciting surface 341 is a buffer portion 31UA. In the cladding 31U, a portion located backward of the plasmon generator 34 and the first layer 351 is a rear portion 31UB.

FIG. 11 is a plan view illustrating a positional relationship between the surface plasmon exciting surface 341 and the evanescent light generating surface 32C, and illustrates the plasmon generator 34 and the core 32 viewed from the magnetic pole 35 side. However, as for the plasmon generator 34, only a surface facing the evanescent light generating surface 32C is illustrated, and the other surfaces are omitted in illustration. As illustrated in FIG. 11, the width of the first surface 341B in the X-axis direction becomes smaller toward the ABS 11S. The first surface 341B has a front end portion 341A3 at a position where end edges 341B1 and 341B2 in the X-axis direction intersect with each other. Angles β formed by the end edges 341B1 and 341B2 with respect to a direction (Y-axis direction) perpendicular to the ABS 11S are equal to each other. The angle β is within a range of 3 to 50 degrees, for example, and in particular, preferably within a range of 10 to 25 degrees.

[3. Method of Manufacturing Magnetic Head Device]

In addition to FIG. 4, referring to FIGS. 12 to 15, the method of manufacturing the magnetic head device 4A will be described. FIGS. 12 to 15 are perspective views each illustrating a process in the method of manufacturing the magnetic head device 4A.

(3-1. Method of Manufacturing Magnetic Read Write Head Section)

Figure 12:
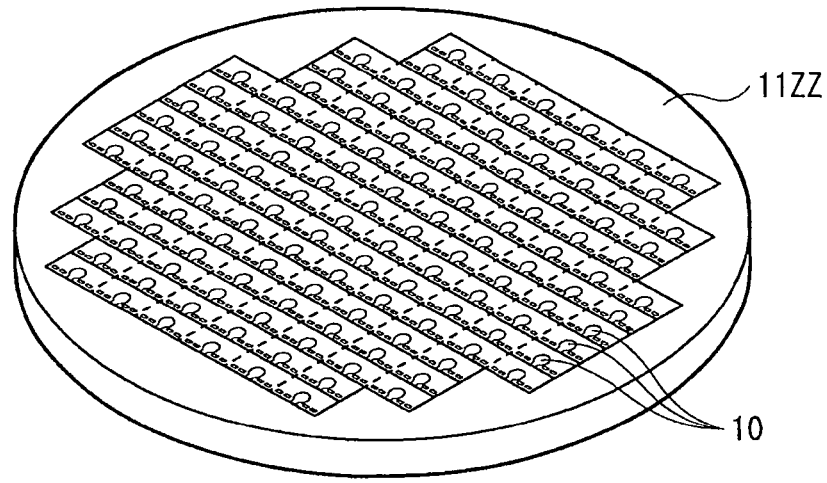
FIG. 12 is a perspective view illustrating a process in a method of manufacturing the magnetic head device illustrated in FIG. 1.

First, as illustrated in FIG. 12, a wafer 11ZZ made of, for example, AlTiC is prepared. The wafer 11ZZ is to be a plurality of sliders 11 eventually. After that, a plurality of magnetic read write head sections 10 is formed in an array on the wafer 11ZZ as described below.

The magnetic read write head section 10 is mainly manufactured by subsequently forming and stacking a series of components by using an existing thin film process. Examples of the existing thin film process include film forming technique such as electrolytic plating and sputtering, patterning technique such as photolithography, etching technique such as dry etching and wet etching, and polishing technique such as chemical mechanical polishing (CMP).

Herein, first, the insulating layer 13 is formed on the slider 11. Next, the lower shield layer 21, the MR element 22 and the insulating layer 24, and the upper shield layer 23 are formed by stacking in this order on the insulating layer 13 to form the read head section 14. Subsequently, the insulating layer 25, the intermediate shield layer 26, and the insulating layer 27 are stacked in order on the read head section 14.

After that, the lower yoke layer 28, the leading shield 29 and the connecting layer 30, the cladding 31L, the core 32, the claddings 33A and 33B, the cladding 31U, the plasmon generator 34, the magnetic pole 35, and the connecting layers 36 and 37 are formed in order on the insulating layer 27. Note that the formation of the leading shield 29 may be omitted. Further, by performing a planarization process after the insulating layer 38 is formed to cover the entire surface, the upper surfaces of the magnetic pole 35, the insulating layer 38, and the connecting layer 37 are planarized. Subsequently, the coil 41 embedded by the insulating layers 39 and 42 is formed. Moreover, the upper yoke layer 43 connected with the magnetic pole 35 and the connecting layer 37 is formed to complete the write head section 16. After that, the cladding 17 is formed on the write head section 16. As a result, the plurality of magnetic read write head sections 10 is formed in an array on the wafer 11ZZ (FIG. 12).

Figure 13:
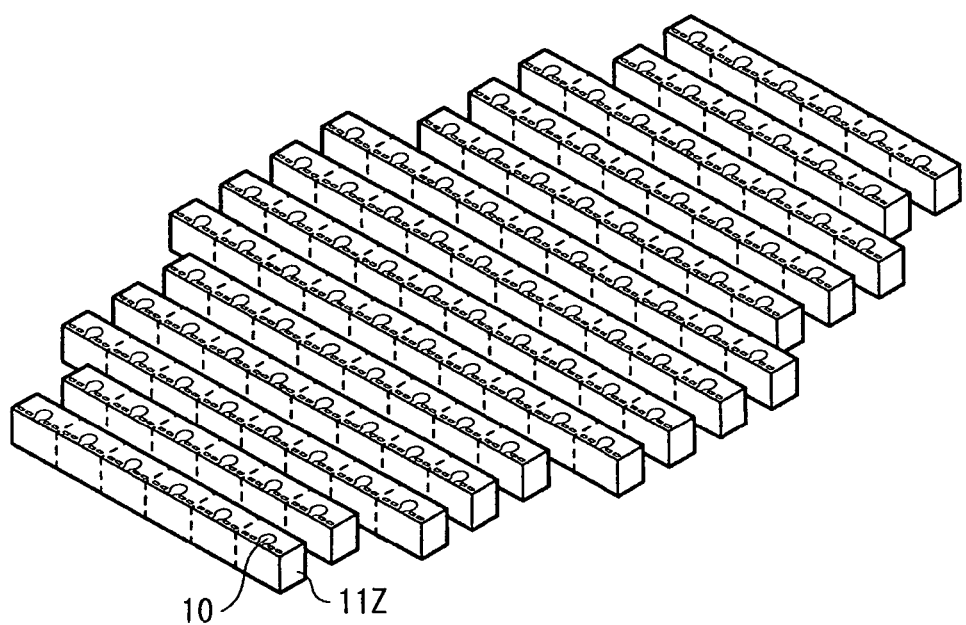
FIG. 13 is a perspective view illustrating a process following the process of FIG. 12.

After that, as illustrated in FIG. 13, the wafer 11ZZ is cut to form a plurality of bars 11Z. The plurality of magnetic read write head sections 10 is formed in line in each of the bars 11Z. Further, one side surface of the bar 11Z is mechanically polished, and is then selectively etched by using the photolithography or the like to form the ABS 11S. Moreover, an end surface opposite from the ABS 11S is mechanically polished to form the rear end surface 32A of the core 32. Subsequently, a part of the end surface of the claddings 31L, 31U, 33A, and 33B, opposite from the ABS 11S, is selectively etched by using the photolithography or the like to form the rear end surfaces 31LT, 31UT, 33AT, and 33BT which have a predetermined surface roughness and are recessed from the rear end surface 32A.

(3-2. Method of Bonding Slider to Light Source Unit)

Figure 14:
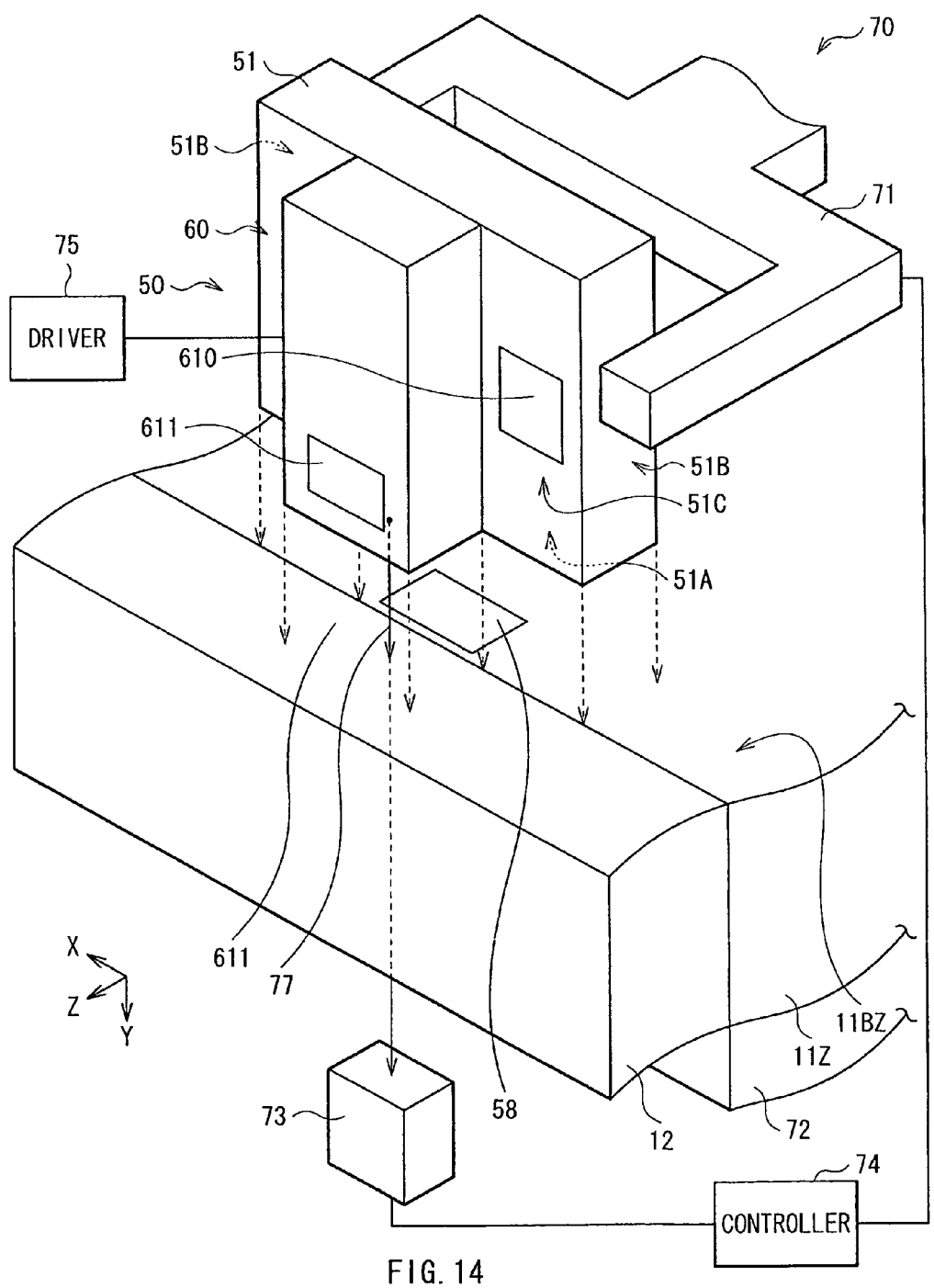
FIG. 14 is a perspective view illustrating a process following the process of FIG. 13.

Next, the light source units 50 are provided to be bonded to the bar 11Z at respective predetermined positions with use of an alignment apparatus 70 as described below (refer to FIG. 14). The alignment apparatus 70 includes a probe 71, a tray 72, a photodetector 73, a controller 74, and a driver 75. The probe 71 is a hold section holding the light source unit 50, and the tray 72 is mounted with the bar 11Z which is divided into the plurality of sliders 11 later. The controller 74 functions to allow the relative position between the light source unit 50 held by the probe 71 and the bar 11Z mounted on the tray 72 to be moved. The driver 75 drives the laser diode 60 to control output thereof. The photodetector 73 receives light which has been emitted from the laser diode 60 and then passed through the thermally-assisted magnetic recording head section 10.

Specifically, first, an adhesive layer 58 is formed by, for example, evaporation method on a predetermined position of a back surface 11BZ of the bar 11B which is to be a back surface 11B of the slider 11 eventually. The adhesive layer 58 is for bonding the light source unit 50 to the slider 11. The adhesive layer 58 is made of, for example, a solder, namely, a simple substance of Sn (tin), or an alloy containing Sn, Pb (lead), or Bi (bismuth). More specifically, an alloy containing SnAu, SnCu, SnAl, SnSi, SnGe, SnMg, SnPb, SnAg, SnZn, SnBi, SnNi, SnPt, PbAu, PbMg, PbBi, BiAu or the like may be used. Note that the adhesive layer 58 may be provided on the bonding surface 51A of the supporting member 51 facing the back surface 11BZ.

Next, the bar 11Z is arranged on the tray 72 of the alignment apparatus 70, and then the light source unit 50 is attached to the probe 71 of the alignment apparatus 70. At this time, the bonding surface 51A of the supporting member 51 is opposed to the back surface 11BZ of the bar 11Z. Subsequently, a predetermined voltage is applied between terminal electrodes 610 and 611 of the laser diode 60 to allow a laser beam 77 to be emitted from the emission center 62A of the active layer 62 (FIG. 4).

Next, an alignment between the light source unit 50 (the laser diode 60) and the magnetic read write head section 10 is performed based on the intensity distribution of a laser beam (for example, a TE polarization component) which has been emitted from the laser diode 60 and then passed through the core 32. Specifically, the light source unit 50 is moved in the X-axis direction (the track width direction) and the Z-axis direction while the laser beam 77 is maintained to be emitted and the photodetector 73 sequentially detects the transmitted light emitted from the core 32. With this operation, maximum peak position of the intensity distribution of the transmitted light detected by the photodetector 73 is allowed to be coincident with the reference position of the magnetic read write head section 10. For example, an alignment between the reference position of the tray 72 and the optical axis of the photodetector 73 is performed in advance, and the alignment between the light source unit 50 and the magnetic read write head section 10 is performed by moving only the light source unit 50 held by the clamp 71.

Figure 15:
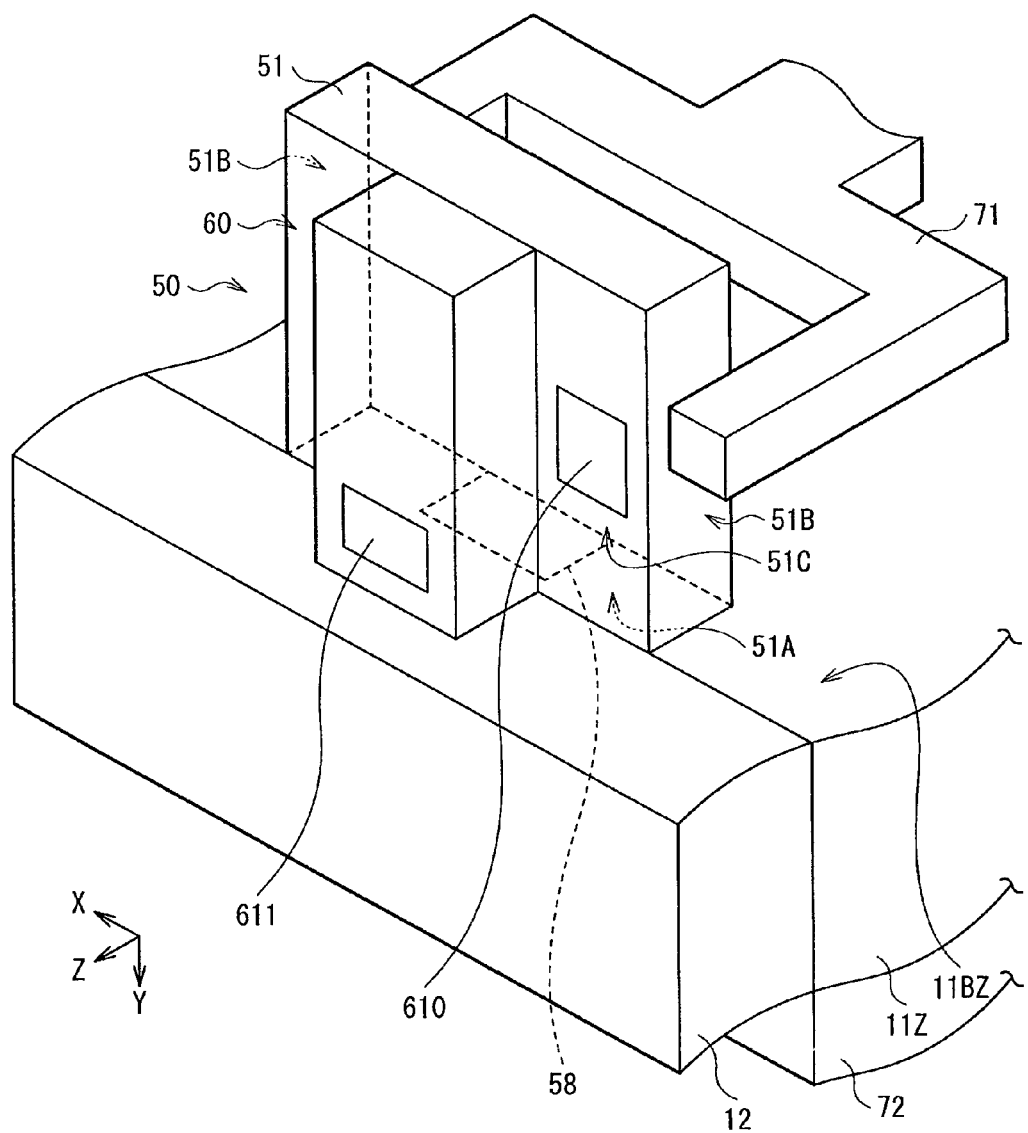
FIG. 15 is a perspective view illustrating a process following the process of FIG. 14.

Thereafter, while the relative position between the light source unit 50 and the magnetic read write head section 10 is maintained, the light source unit 50 is moved in the Y-axis direction to come into contact with the slider 11 through the adhesive layer 58 as illustrated in FIG. 15. Consequently, the alignment between the light source unit 50, the bar 11Z, and the element forming layer 12 is completed.

Subsequently, while the relative position between the light source unit 50 and the thermally-assisted magnetic recording head section 10 is maintained, a laser beam LB with a predetermined wavelength which passes through the supporting member 51 is irradiated to the both side surfaces 51B of the supporting member 51, for example. As the laser beam LB, for example, Nd-YAG laser light ($\lambda=1064$ nm) may be used. Consequently, the supporting member 51 is heated.

The adhesive layer 58 receiving energy is melted by heat conduction from the supporting member 51 which is heated by irradiation with the laser beam LB. After that, when the irradiation with the laser beam LB is stopped, the melted adhesive layer 58 is rapidly solidified. As a result, the supporting member 51 of the light source unit 50 and the slider 11 are bonded with accurate positional relationship. Incidentally, the irradiation with the laser beam LB is performed in an extremely short time of, for example, about 1 to 50 ms. Accordingly, the magnetic read write head section 10 embedded in the element forming layer 12 may be prevented from being affected by the heat.

In such a way, the manufacture of the magnetic head device 4A is completed.

[4. Control Circuit of Magnetic Disk Unit and Operation Thereof]

Next, referring to FIG. 16, the circuit configuration of the control circuit of the magnetic disk unit illustrated in FIG. 1 and the operation of the magnetic read write head section 10 will be described below. The control circuit includes a control LSI (large-scale integration) 100, a ROM (read only memory) 101 connected to the control LSI 100, a write gate 111 connected to the control LSI 100, and a write circuit 112 connecting the write gate 111 to the coil 41. The control circuit further includes a constant current circuit 121 connected to the MR element 22 and the control LSI 100, an amplifier 122 connected to the MR element 22, and a demodulation circuit 123 connected to the output end of the amplifier 122 and the control LSI 100. The control circuit further includes a laser control circuit 131 connected to the laser diode 60 and the control LSI 100, and a temperature detector 132 connected to the control LSI 100.

Herein, the control LSI 100 provides write data and a write control signal to the write gate 111. Moreover, the control LSI 100 provides a read control signal to the constant current circuit 121 and the demodulation circuit 123, and receives read data output from the demodulation circuit 123. In addition, the control LSI 100 provides a laser ON/OFF signal and an operation current control signal to the laser control circuit 131.

The temperature detector 132 detects the temperature of the magnetic recording layer of the magnetic disk 2 to transmit information of the temperature to the control LSI 100.

The ROM 101 stores a control table and the like to control an operation current value to be supplied to the laser diode 60.

At the time of write operation, the control LSI 100 supplies the write data to the write gate 111. The write gate 111 supplies the write data to the write circuit 112 only when the write control signal instructs write operation. The write circuit 112 allows the write current to flow through the coil 41 according to the write data. As a result, write magnetic field is generated from the magnetic pole 35, and data is written into the magnetic recording layer of the magnetic disk 2 by the write magnetic field.

At the time of read operation, the constant current circuit 121 supplies a constant sense current to the MR element 22 only when the read control signal instructs the read operation.

The output voltage of the MR element 22 is amplified by the amplifier 122, and is then received by the demodulation circuit 123. The demodulation circuit 123 demodulates the output of the amplifier 122 to generate read data to be provided to the control LSI 100 when the read control signal instructs the read operation.

The laser control circuit 131 controls the supply of the operation current to the laser diode 60 based on the laser ON/OFF signal, and controls the value of the operation current supplied to the laser diode 60 based on the operation current control signal. The operation current larger than an oscillation threshold value is supplied to the laser diode 60 by the control of the laser control circuit 131 when the laser ON/OFF signal instructs the ON operation. As a result, the laser light is emitted from the laser diode 60 and then propagates through the core 32. Subsequently, the near-field light NF (described later) is generated from the tip portion 34G of the plasmon generator 34, a part of the magnetic recording layer of the magnetic disk 2 is heated by the near-field light NF, and thus the coercivity in the heated part is lowered. At the time of writing, the write magnetic field generated from the magnetic pole 35 is applied to the part of the magnetic recording layer with lowered coercivity, and therefore data recording is performed.

The control LSI 100 determines the value of the operation current of the laser diode 60 with reference to the control table stored in the ROM 101, based on the temperature and the like of the magnetic recording layer of the magnetic disk 2 measured by the temperature detector 132, and controls the laser control circuit 131 with use of the operation current control signal so that the operation current of the value is supplied to the laser diode 60. The control table includes, for example, the oscillation threshold value of the laser diode 60 and data indicating temperature dependency of light output-operation current property. The control table may further include data indicating a relationship between the operation current value and the increased amount of the temperature of the magnetic recording layer heated by the near-field light NF, and data indicating temperature dependency of the coercivity of the magnetic recording layer.

Figure 16:
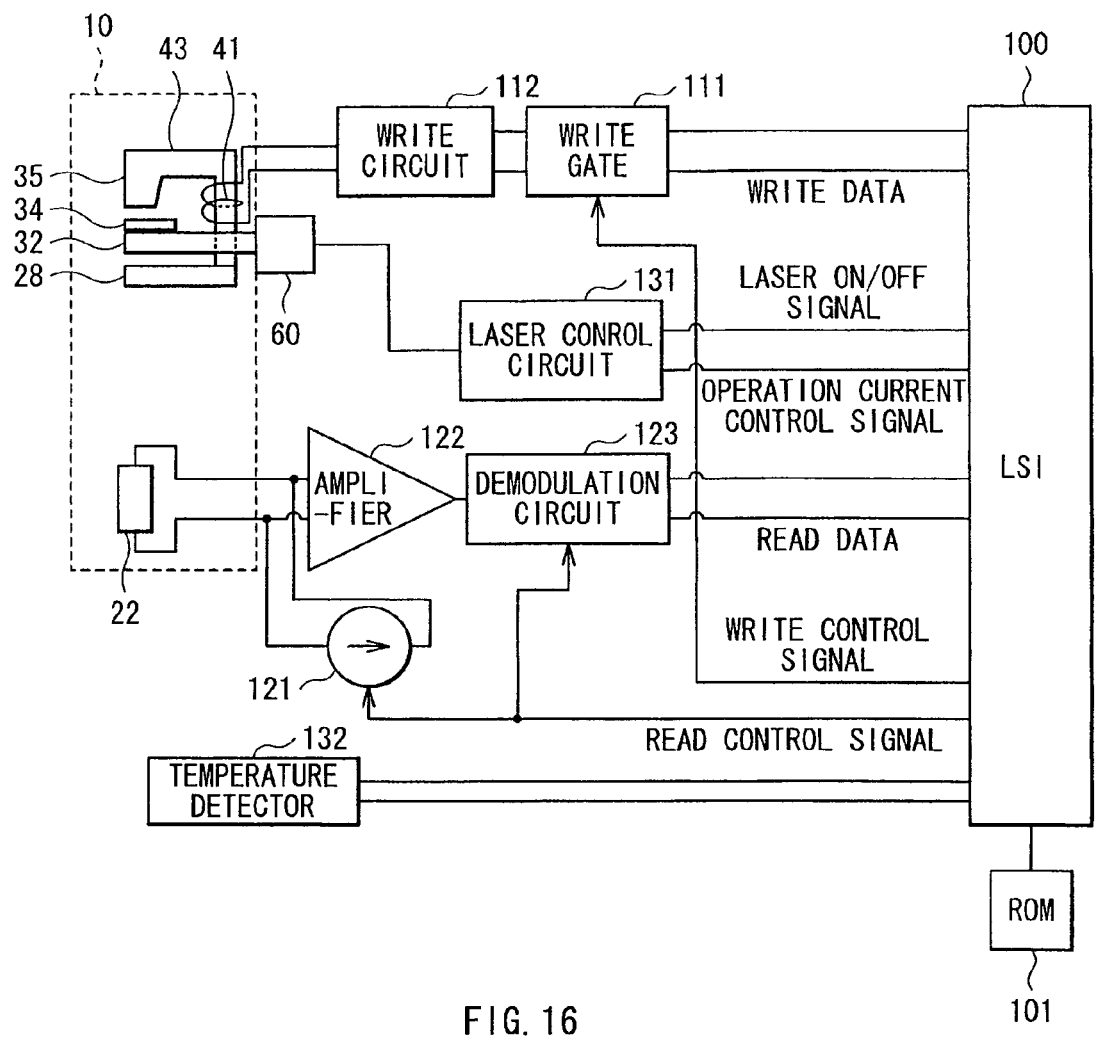
FIG. 16 is a block diagram illustrating a circuit configuration of the magnetic disk unit illustrated in FIG. 1.

The control circuit illustrated in FIG. 16 has a signal system for controlling the laser diode 60, that is, a signal system of the laser ON/OFF signal and the operation current control signal, independent of the control signal system of write/read operation. Therefore, various conduction modes to the laser diode 60 are allowed to be achieved, in addition to the conduction to the laser diode 60 simply operated with the write operation. Note that the configuration of the control circuit of the magnetic disk unit is not limited to that illustrated in FIG. 16.

Figure 17:
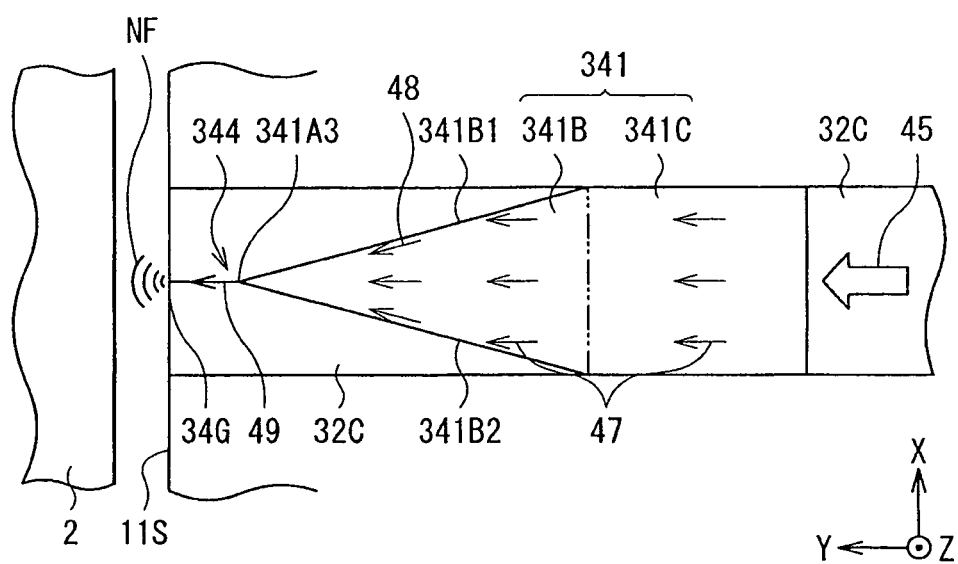
FIG. 17 is an explanatory diagram for explaining operations of the magnetic read write head.

Subsequently, a principle of near-field light generation in the embodiment and a principle of thermally-assisted magnetic recoding with use of the near-field light will be described with reference to FIGS. 10 and 17. Similarly to FIG. 10, FIG. 17 is a plane view illustrating a positional relationship between the surface plasmon exciting surface 341 and the evanescent light generating surface 32C, and illustrates a state where the plasmon generator 34 and the core 32 are viewed from the magnetic pole 35 side.

The laser light L62 which has been emitted from the laser diode 60 propagates through the core 32 to reach near the plasmon generator 34. At this time, laser light 45 is totally reflected by the evanescent light generating surface 32C that is an interface between the core 32 and the buffer section 31UA, and therefore evanescent light 46 (FIG. 10) leaking into the buffer section 31UA is generated. After that, the evanescent light 46 couples with charge fluctuation on the surface plasmon exciting surface 341 out of the outer surface of the plasmon generator 34 to induce a surface plasmon polariton mode. As a result, surface plasmons 47 (FIG. 17) are excited on the surface plasmon exciting surface 341. The surface plasmons 47 propagate on the surface plasmon exciting surface 341 toward the tip portion 34G. The first surface 341B of the surface plasmon exciting surface 341 is configured so that the width thereof in the X-axis direction becomes narrower toward the ABS 11S as described above. Accordingly, when propagating on the first surface 341B, the surface plasmons 47 are gradually converted into edge plasmons 48 (FIG. 17) as surface plasmons propagating along the edge rims 341B1 and 341B2, and the electric field intensity of the plasmons including the surface plasmons 47 and the edge plasmons 48 is increased. The surface plasmons 47 and the edge plasmons 48 are converted into edge plasmons 49 (FIG. 17) when reaching the edge 344, and the edge plasmons 49 propagate along the edge 344 toward the ABS 11S. The edge plasmons 49 eventually reach the tip portion 34G. As a result, the edge plasmons 49 are collected at the tip portion 34G to generate the near-field light NF from the tip portion 34G, based on the edge plasmons 49. The near-field light NF is irradiated toward the magnetic disk 2 and reaches the surface (recording surface) of the magnetic disk 2 to heat a part of the magnetic recording layer of the magnetic disk 2. As a result, the coercivity at the heated part of the magnetic recording layer is lowered. In the thermally-assisted magnetic recording, with respect to the part of the magnetic recording layer with the coercivity thus lowered, data recording is performed by application of the write magnetic filed generated by the magnetic pole 35.

It is considered that the following first and second principals lead to the increase of the electric field intensity of the plasmons on the first surface 341B. First, the description is made for the first principle. In the embodiment, on the metal surface of the surface plasmon exciting surface 341, the surface plasmons 47 are excited by the evanescent light 46 generated from the evanescent light generating surface 32C. The surface plasmons 47 propagate on the surface plasmon exciting surface 341 toward the tip portion 34G. The wave number of the surface plasmons 47 propagating on the first surface 341B is gradually increased with decreasing the width of the first surface 341B in the X-axis direction, that is, toward the ABS 11S. As the wave number of the surface plasmons 47 is increased, the propagating speed of the surface plasmons 47 is decreased. As a result, the energy density of the surface plasmons 47 is increased to increase the electric field intensity of the surface plasmons 47.

Next, the description is made for the second principle. When the surface plasmons 47 propagate on the surface plasmon exciting surface 341 toward the tip portion 34G, a part of the surface plasmons 47 collide with the edge rims 341B1 and 341B2 of the first surface 341B and is scattered, and accordingly a plurality of plasmons with different wave numbers is generated. A part of the plurality of the plasmons thus generated is converted into the edge plasmons 48 whose wave number is larger than that of the surface plasmons propagating on the plane. In such a way, the surface plasmons 47 are gradually converted into the edge plasmons 48 propagating along the edge rims 341B1 and 341B2, and accordingly, the electric field intensity of the edge plasmons 48 is gradually increased. In addition, the edge plasmons 48 have a larger wave number and slower propagating speed compared with the surface plasmons propagating on the plane. Therefore, the surface plasmons 47 are converted into the edge plasmons 48 to increase the energy density of the plasmons. Further, on the first surface 341B, the surface plasmons 47 are converted into the edge plasmons 48 as described above, and new surface plasmons 47 are also generated based on the evanescent light 46 emitted from the evanescent light generating surface 32C. The new surface plasmons 47 are also converted into the edge plasmons 48. In this way, the electric field intensity of the edge plasmons 48 is increased. The edge plasmons 48 are converted into the edge plasmons 49 propagating through the edge 344. Therefore, the edge plasmons 49 are obtainable which have the increased electric field intensity compared with the surface plasmons 47 at the beginning of generation.

In the embodiment, on the first surface 341B, the surface plasmons 47 propagating on the plane coexist with the edge plasmons 48 whose wave number is larger than that of the surface plasmons 47. It is considered that, on the first surface 341B, the increase of the electric field intensity of both the surface plasmons 47 and the edge plasmons 48 occurs due to the first and second principals described above. Accordingly, in the embodiment, compared with a case where one of the first and second principals is effective, the electric field intensity of the plasmons may be further increased.

[5. Effect]

As described above, in the first embodiment, a part of each of the rear end surfaces 31LT, 31UT, 33AT, and 33BT of the claddings 31 and 33 surrounding the core 32 has a surface roughness greater than that of the rear end surface 32A of the core 32. Therefore, the laser light L62 irradiated to the rear end surfaces 31LT, 31UT, 33AT, and 33BT is scattered, and thus returning of the laser light L62 to the laser diode 60 due to reflection is allowed to be suppressed. As a result, the magnetic disk unit according to the embodiment is allowed to stably perform the magnetic recording with higher density while the operation of the laser diode 60 is stabilized and variation in the intensity and the spot size of the near-field light NF generated in the ABS 11S is suppressed. Note that, to prevent the return light, a method of providing an antireflection film on a surface of the waveguide opposed to the laser diode 60 is conceivable. In this case, however, antireflection films suitable for respective optical characteristics of the core and the cladding need to be provided to obtain favorable antireflection characteristics. However, individual formation of the antireflection film covering the core and the antireflection film covering the cladding with use of different materials is extremely complicated and is not realistic.

In addition, in the first embodiment, the rear end surfaces 31LT, 31UT, 33AT, and 33BT in the second region R2 are located at the receded position from the rear end surface 32A of the core 32. Therefore, the structure which allows the distance between the rear end surface 32A to which the laser light L62 is incident and the emission surface of the laser light L62 of the laser diode 60 in the Y-axis direction to be decreased, and is excellent in the relative positional accuracy between the light source unit 50 and the magnetic read write head section 10 on the XZ-plane is obtainable. This is because, when the alignment and the bonding between the light source unit 50 and the magnetic read write head section 10 is performed, even if any foreign substance is contained in the gap between the emission surface of the laser diode 60 and the rear end surface 32A, the foreign substance is allowed to be washed away by a cleaning solution. In the case where the rear end surface 32A of the core 32 is not projected from the peripheral surfaces, the cleaning solution is not allowed to permeate sufficiently because the gap is extremely small, and thus the foreign substance may not be eliminated. In such a case, the foreign substance causes decline in the alignment accuracy during the alignment processing, or decline in the optical coupling efficiency during operation. On the other hand, in the first embodiment, such circumstances are avoidable for the above-described reasons.

Moreover, in the embodiment, the rear end surfaces 31LT, 31UT, 33AT, and 33BT in the first region R1 surrounding the rear end surface 32A of the core 32 are included in a plane common to the rear end surface 32A of the core 32. Furthermore, the outer diameter φ1 of the first region R1 is larger than the mode field diameter of the waveguide. Accordingly, increasing of propagation loss of the laser light 45 propagating through the core 32 is avoidable, and the recording efficiency is allowed to be prevented from decreasing.

Second Embodiment

Next, a magnetic disk unit according to a second embodiment of the invention is described. In the second embodiment, the structure is similar to the above-described first embodiment except that a rear end surface of each of a core and a cladding in the magnetic write read head section 10 has a shape different from that of the core and the cladding in the first embodiment. Therefore, the shapes of the rear end surfaces will be described below, and the other description will be appropriately omitted.

Figure 18A:
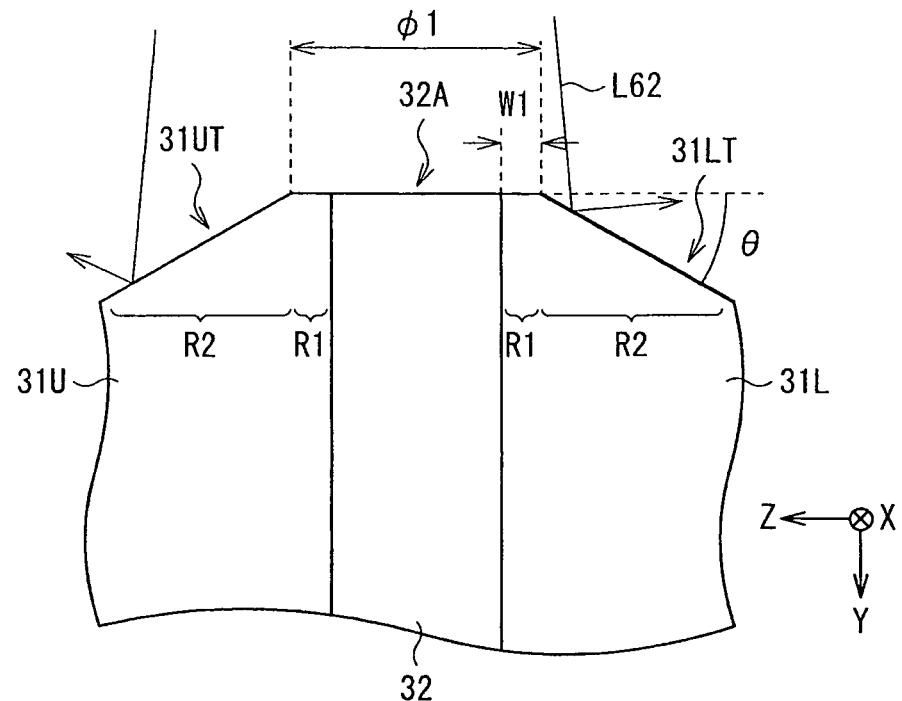
FIGS. 18A and 18B are enlarged sectional views each illustrating the periphery of a rear end surface of a waveguide in a magnetic read write head section according to a second embodiment of the invention.
Figure 18B:
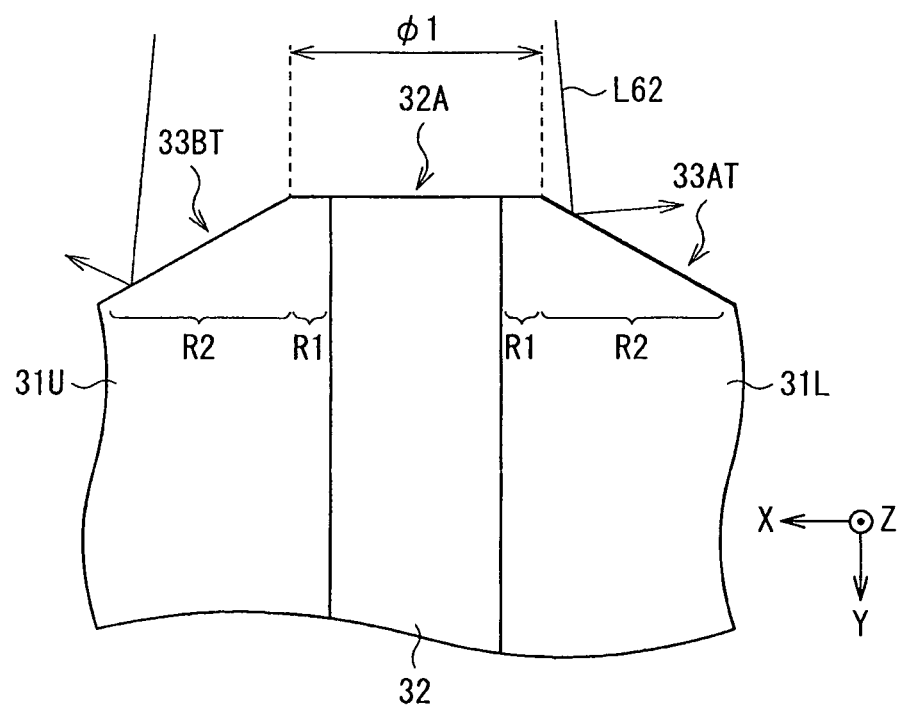

FIGS. 18A and 18B each illustrate, in an enlarged manner, a shape of an opposed surface of the core and the cladding opposed to the laser diode 60 which is located on an opposite side from the ABS 11S, and correspond to FIGS. 7A and 7B, respectively. In the above-described first embodiment, the return-light preventing structure is achieved by forming an irregular shape on the rear end surfaces 31LT, 31UT, 33AT, and 33BT in the second region R2 by etching or the like. In other words, the structure in which the laser light L62 from the laser diode 60 is scattered on the rear end surfaces 31LT, 31UT, 33AT, and 33BT in the second region R2.

In contrast, in the second embodiment, on the opposed surface of the waveguide opposed to the laser diode 60, the rear end surfaces 31LT, 31UT, 33AT, and 33BT are inclined relative to the rear end surface 32A, so as to be separated away from the laser diode 60 with increasing distance from the core 32. In this case, the rear end surfaces 31LT, 31UT, 33AT, and 33BT each include an inclined surface inclined at an angle θ of 15 degrees or more and less than 90 degrees, for example, relative to the rear end surface 32A of the core 32. Therefore, the laser light L62 irradiated to the rear end surfaces 31LT, 31UT, 33AT, and 33BT does not return to the active layer 62 of the laser diode 60, and is reflected to the other direction. As a result, also in the second embodiment, similar to the magnetic disk unit as the above-described first embodiment, the operation of the laser diode 60 is stabilized. Consequently, variation in the intensity and the spot size of the near-field light NF generated in the ABS 11S is suppressed, and the magnetic recording with higher density is allowed to be stably performed.

In addition, in the second embodiment, since the rear end surfaces 31LT, 31UT, 33AT, and 33BT in the second region R2 are inclined, a foreign substance contained between the light source unit 50 and the magnetic read write head section 10 is allowed to be easily washed out by a cleaning solution when the alignment and the bonding therebetween is performed. Accordingly, a structure which allows the distance between the rear end surface 32A and the emission surface of the laser light L62 of the laser diode 60 in the Y-axis direction to be decreased, and is excellent in the relative position accuracy between the light source unit 50 and the magnetic read write head section 10 on the XZ-plane is obtainable.

Moreover, also in the second embodiment, the rear end surfaces 31LT, 31UT, 33AT, and 33BT in the first region R1 surrounding the rear end surface 32A of the core 32 are included in a plane common to the rear end surface 32A of the core 32. Furthermore, the outer diameter of the first region R1 is larger than the mode field diameter of the waveguide. Accordingly, increasing of propagation loss of the laser light 45 propagating through the core 32 is avoidable, and the recording efficiency is allowed to be prevented from decreasing.

Third Embodiment

Figure 19:
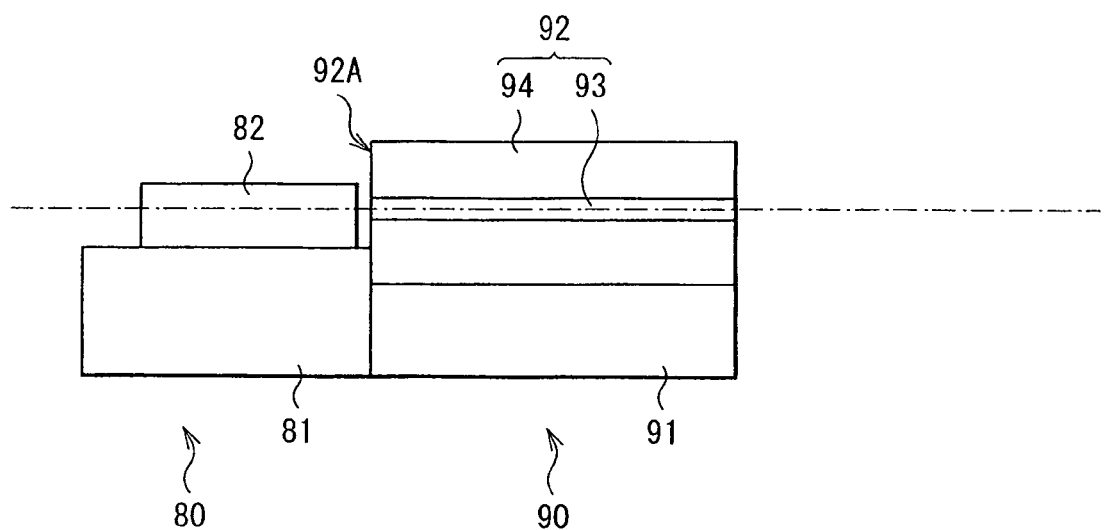
FIG. 19 is a schematic view illustrating a configuration of a light transmission unit according to a third embodiment of the invention.

Next, a light transmission unit according to a third embodiment of the invention is described referring to FIG. 19. The light transmission unit includes a light source section 80 provided with a laser diode 82 on a substrate 81, and a light transmission section 90 provided with a waveguide 92 on a substrate 91. In this case, the substrates 81 and 91 are formed of a material similar to that of the substrate 51, for example, and the laser diode 82 has a configuration similar to that of the laser diode 60, for example. In addition, the waveguide 92 has an incident end surface 92A to which laser light from the laser diode 82 is incident, and the incident end surface 92A is arranged to face a laser light emission surface of the laser diode 82.

Figure 20:
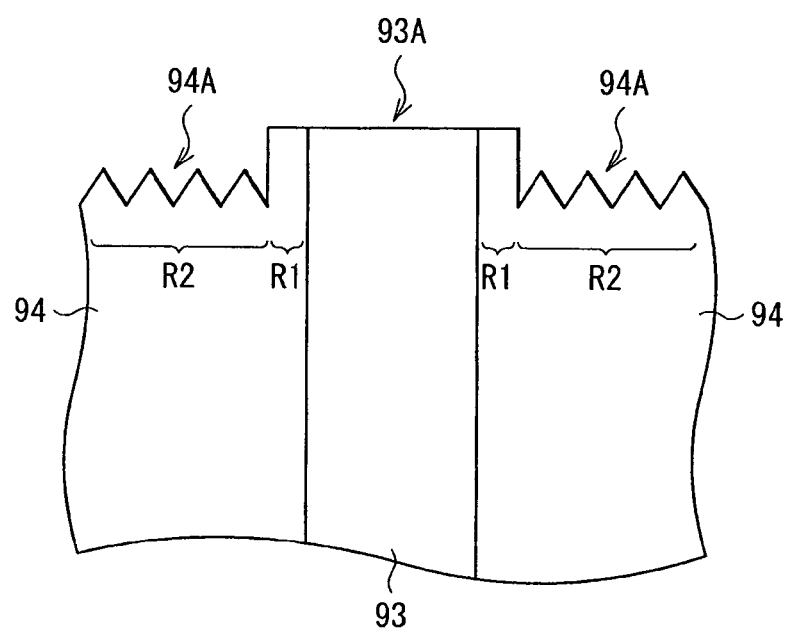
FIG. 20 is an enlarged sectional view illustrating a configuration of a main part of the light transmission unit illustrated in FIG. 19.

As illustrated in FIG. 20, the waveguide 92 has a core 93 extending in one direction, and a cladding 94 surrounding the core 93. The incident end surface 92A of the waveguide 92 has a return-light preventing structure. This structure suppresses returning of the laser light L82 from the laser diode 82 to the laser diode 82 after reflection. Specifically, the incident end surface 92A includes an end surface 93A of the core 93 and an end surface 94A of the cladding 94; and at least a part of the end surface 94A has a surface roughness greater than that of the end surface 93A. The end surface 94A includes a first region R1 surrounding the outer edge of the end surface 93A of the core 93, and a second region R2 surrounding the first region R1. Herein, the surface roughness of the end surface 94A in the second region R2 is greater than that of the end surface 93A of the core 93. Therefore, laser light irradiated to the second region R2 is scattered, and thus returning of the laser light to the laser diode 82 due to reflection is allowed to be suppressed. As a result, in the light transmission unit according to the third embodiment, operation of the laser diode 82 is stabilized and laser light L82 with less varied intensity is allowed to be oscillated and be transmitted.

EXAMPLES

Examples of the invention will be described in detail.

Example 1

Figure 21A:
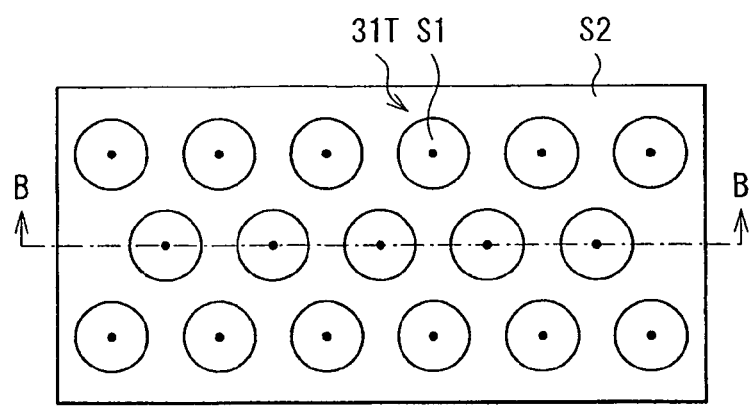
FIG. 21A is a plan view schematically illustrating a rear end surface of a magnetic head device in Example.
Figure 21B:
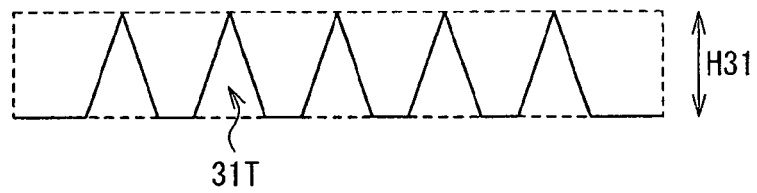
FIG. 21B is a sectional view illustrating a cross-section orthogonal to a plane in FIG. 21A.

As for the magnetic head device 4A including the core and the claddings whose rear end surfaces have the shapes described in the above-described first embodiment (refer to FIGS. 7A and 7B), the intensity and the coupling efficiency of the reflected return light were evaluated. In this example, examination was performed that how the intensity and the coupling efficiency of the reflected return light were affected by a volume ratio occupied by a plurality of substantially pyramid shaped or substantially conical projections to a space on the rear end surfaces 31LT, 31UT, 33AT, and 33BT of the claddings and a height (average value) of the projections. The results are illustrated in Table 1. Incidentally, the wavelength of the laser light 62 from the laser diode 60 was 800 nm. Note that the space herein means a space represented by a plane area S2 of the rear end surfaces 31LT, 31UT, 33AT, and 33BT of the cladding, parallel to the rear end surface 32A of the core and an average height 31H of the projections 31T (refer to FIGS. 21A and 21B). Therefore, the volume ratio in Table 1 is a ratio of a sum total of volumes of the projections 31T (S1×H31/3) to the space volume S2×H31. FIG. 21A is a schematic plan view illustrating the rear end surface of the cladding viewed from the laser diode 60, and FIG. 21B is a schematic sectional view illustrating a cross-section orthogonal to the surface illustrated in FIG. 21A.

TABLE 1

| | | Volume Ratio of Projections | | | |
|---|---|---|---|---|---|
| | | 5 | 20 | 33 | 40 |
| Height of Projections H31 [nm] | 100 | o | o | o | Contamination |
| | 200 | o | o | oo | Contamination |
| | 300 | o | oo | oo | Contamination |
| | 400 | oo | oo | oo | Contamination |
| | 500 | oo | oo | oo | Contamination |
| | 600 | oo | oo | oo | Contamination |
| | 700 | o | oo | oo | Contamination |
| | 800 | o | o | oo | Contamination |
| | 900 | o | o | o | Contamination |

As illustrated in Table 1, contamination was confirmed when the volume ratio of all the projections occupying the space was equal to or larger than 40%. It was conceivable that this was because a flat region between the projections in the rear end surfaces 31LT, 31UT, 33AT, and 33BT of the cladding was decreased, a path of a cleaning solution was not sufficiently secured, and therefore the foreign substance was not washed out. In addition, it was found that when the volume ratio of all the projections was within the range of 5% to 33%, the effect of decreasing the reflected return light was increased with increasing the volume ratio of all the projections, with a case where the height of the projection was 500 nm as a center. Note that, in Table 1, the symbol "o (circle)" indicates that favorable effect of decreasing the reflected return light (in this case, the effect in which the reflected light amount is decreased within a range of larger than 20% and 80% or less compared with no projections) is obtainable, and the symbol "oo (double circle)" indicates that more favorable effect of decreasing the reflected return light (in this case, the effect in which the reflected light amount is decreased to 20% or lower compared with no projections) is obtainable.

Example 2

Next, as for the magnetic head device 4A including the core and the claddings whose rear end surfaces have the shapes described in the above-described second embodiment (refer to FIGS. 18A and 18B), occurrence of contamination and the coupling efficiency were evaluated. In this example, examination was performed that how the occurrence of the contamination and the coupling efficiency were affected by change of the width W1 of the first region R1 in a radial direction, namely, {(the outer diameter of the first region R1)−(the outer diameter of the core 93)}/2, and change of the angle θ. The results are illustrated in Table 2. Incidentally, the wavelength of the laser light 62 from the laser diode 60 was 800 nm, the core 32 was formed of $TaO_x$ having a refractive index of 2.08, and the claddings 31L, 31U, 33A, and 33B were formed of $Al_2O_3$ having a refractive index of 1.672. In addition, a distance between the emission surface of the laser light L62 of the laser diode 60 and the rear end surface 32A of the core 32 was 2 μm.

TABLE 2

| Angle θ [degree] | W1 [μm] | | | | |
|---|---|---|---|---|---|
| | 0 | 0.5 | 1 | 10 | 20 |
| 0 | Contamination | Contamination | Contamination | Contamination | Contamination |
| 8 | Contamination | Contamination | Contamination | Contamination | Contamination |
| 15 | ○ | ○ | ○ | ○ | Contamination |
| 30 | ○ | ○ | ○ | ○ | Contamination |
| 45 | ○ | ○ | ○ | ○ | Contamination |
| 60 | ○ | ○ | ○ | ○ | Contamination |
| 75 | Decline in Coupling Efficiency | ○ | ○ | ○ | Contamination |
| 90 | Decline in Coupling Efficiency | Decline in Coupling Efficiency | ○ | ○ | Contamination |

As illustrated in Table 2, when the width W1 was equal to or less than 10 μm and the angle θ was equal to or larger than 15 degrees, the occurrence of the contamination was avoidable. It was conceivable that this was because a foreign substance contained between the emission surface of the laser light L62 of the laser diode 60 and the rear end surface 32A of the core 32 was sufficiently washed out by a cleaning solution. Incidentally, decline in the coupling efficiency was observed under some conditions where the width W1 was equal to or lower than 0.5 μm. This was because the width W1 was shorter than the wavelength of the laser light 62. Therefore, it was confirmed that favorable coupling efficiency was obtainable when the width W1 was equal to or larger than the wavelength of the laser light 62.

Hereinbefore, although the invention has been described with referring to the embodiments, the invention is not limited to the above-described embodiments, and various modifications may be made. For example, in the embodiments, although exemplified is a CPP-type GMR element as a read element, the read element is not limited thereto and may be a CIP (current in plane)-GMR element. In such a case, an insulating layer needs to be provided between an MR element and a lower shield layer, and between the MR element and an upper shield layer, and a pair of leads for supplying a sense current to the MR element needs to be inserted into the insulating layer. Alternatively, a TMR (tunneling magnetoresistance) element with a tunnel junction film may be used as a read element.

In addition, in the thermally-assisted magnetic recording head according to the invention, the configurations (shapes, positional relationships, and the like) of the waveguide, the plasmon generator, the magnetic pole, and the like are not limited to those described in the above-described embodiments, and any thermally-assisted magnetic recording head having other configurations may be available.

Moreover, the application of the light transmission unit according to the invention is not limited to a thermally-assisted magnetic recording head.

Furthermore, in the invention, the irregular shape on the rear end surface in the second region of the cladding may be formed by providing various kinds of shapes of projections such as conical projections, hemispherical projections, and multi-sided pyramid shaped projections.

The correspondence relationships between the reference numerals and the components of the above-described embodiments are collectively illustrated here.

1 . . . housing, 2 . . . magnetic disk, 3 . . . head arm assembly (HAA), 4 . . . head gimbal assembly (HGA), 4A . . . magnetic head device, 4B . . . suspension, 5 . . . arm, 6 . . . driver, 7 . . . fixed shaft, 8 . . . bearing, 9 . . . spindle motor, 10 . . . magnetic read write head section, 11 . . . slider, 11A . . . element forming surface, 11B . . . back surface, 11S . . . air bearing surface (ABS), 12 . . . element forming layer, 13 . . . insulating layer, 14 . . . read head section, 16 . . . write head section, 17 . . . cladding, 21 . . . lower shield layer, 22 . . . MR element, 23 . . . upper shield layer, 24, 25, 27, 38, 39, 42 . . . insulating layer, 28 . . . lower yoke layer, 29 . . . leading shield, 30, 36, 37 . . . connecting layer, 31L, 31U, 33A, 33B . . . cladding, 32, 72 . . . core, 34 . . . plasmon generator, C34 . . . mid-portion, W34 . . . wing portion, 34A to 34C . . . first to third portions, 34G . . . tip portion, 34L . . . lower layer, 34U . . . upper layer, 341 . . . surface plasmon exciting surface, 344 . . . edge, 35, 75 . . . magnetic pole, 351 . . . first layer, 352 . . . second layer, 40A, 40B . . . connecting section, 41 . . . coil, 43 . . . upper yoke layer, 45 . . . laser light, 46 . . . evanescent light, 47 . . . surface plasmon, 48, 49 . . . edge plasmon, 50 . . . light source unit, 51 . . . supporting member, 51A . . . bonding surface, 51B . . . side surface, 51C . . . light source mounting surface, 58 . . . adhesive layer, 60 . . . laser diode, 61 . . . lower electrode, 62 . . . active layer, 63 . . . upper electrode, 64 . . . reflective layer, 65 . . . n-type semiconductor layer, 66 . . . p-type semiconductor layer, 70 . . . alignment apparatus, 71 . . . probe, 72 . . . tray, 73 . . . photodetector, 74 . . . controller, 75 . . . driver, 77 . . . laser beam, 80 . . . light source section, 81 . . . substrate, 82 . . . laser diode, 90 . . . light transmission section, 91 . . . substrate, 92 . . . waveguide, 92A . . . incident end surface, 93 . . . core, 94 . . . cladding, NF . . . near-field light.

What is claimed is:

1. A thermally-assisted magnetic recording head, comprising:
    a laser light source having an emission surface, the emission surface allowing laser light to be emitted therefrom;
    a waveguide having a core and a cladding, the core allowing the laser light emitted from the laser light source to propagate therethrough, and the cladding surrounding the core;
    a magnetic pole; and
    a plasmon generator, wherein
    each of the core and the cladding has an end surface facing the emission surface, and
    the end surface of the cladding suppresses returning of the laser light to the laser light source.

2. The thermally-assisted magnetic recording head according to claim 1, wherein
    the end surface of the cladding has surface roughness greater than surface roughness of the end surface of the core.

3. The thermally-assisted magnetic recording head according to claim 2, wherein
    the end surface of the core is more projected toward the laser light source than the end surface of the cladding.

4. The thermally-assisted magnetic recording head according to claim 2, wherein
    the end surface of the cladding includes a first region and a second region, the first region surrounding an outer edge of the end surface of the core and being included in a plane common to the end face of the core, and the second region being located outside of the first region while surrounding an outer edge of the first region and being recessed from the end surface of the core.

5. The thermally-assisted magnetic recording head according to claim 4, wherein
the first region has an outside diameter larger than a mode field diameter of the waveguide.

6. The thermally-assisted magnetic recording head according to claim 1, wherein
the end surface of the cladding is so inclined, relative to the end surface of the core, as to be separated away from the laser light source with increasing distance from the core.

7. The thermally-assisted magnetic recording head according to claim 6, wherein
an angle between the end surface of the cladding and the end surface of the core is equal to or larger than 15 degrees.

8. The thermally-assisted magnetic recording head according to claim 1, wherein
the end surface of the cladding includes a first region and a second region, the first region surrounding an outer edge of the end surface of the core and being included in a plane common to the end surface of the core, and the second region being located outside of the first region while surrounding an outer edge of the first region and being so inclined, relative to the end surface of the core, as to be separated away from the laser light source with increasing distance from the core.

9. The thermally-assisted magnetic recording head according to claim 8, wherein
an angle between the second region of the end surface of the cladding and the end surface of the core is equal to or larger than 15 degrees.

10. The thermally-assisted magnetic recording head according to claim 9, wherein
the first region has an outside diameter larger than a mode field diameter of the waveguide.

11. A head gimbal assembly, comprising:
a magnetic head slider having a side surface, the side surface including the thermally-assisted magnetic recording head according to claim 1 thereon; and
a suspension having an end, the end being attached with the magnetic head slider.

12. A head arm assembly, comprising:
a magnetic head slider having a side surface, the side surface including the thermally-assisted magnetic recording head according to claim 1 thereon;
a suspension having a first end and a second end, the first end being attached with the magnetic head slider; and
an arm supporting the second end of the suspension.

13. A magnetic disk unit with a magnetic recording medium and a head arm assembly, the head arm assembly comprising:
a magnetic head slider having a side surface, the side surface including the thermally-assisted magnetic recording head according to claim 1 thereon;
a suspension having a first end and a second end, the first end being attached with the magnetic head slider; and
an arm supporting the second end of the suspension.

14. A light transmission unit, comprising:
a laser light source having an emission surface, the emission surface allowing laser light to be emitted therefrom; and
a waveguide having a core and a cladding, the core allowing the laser light emitted from the laser light source to propagate therethrough, and the cladding surrounding the core, wherein
each of the core and the cladding includes an end surface facing the emission surface, and
the end surface of the cladding suppresses returning of the laser light to the laser light source.

* * * * *